(12) United States Patent
Kojima et al.

(10) Patent No.: US 11,689,016 B2
(45) Date of Patent: Jun. 27, 2023

(54) SOLAR POWER GENERATION NETWORK SHUT-OFF UNIT AND A SOLAR POWER GENERATION NETWORK SHUT-OFF SYSTEM PROVIDED WITH SAME

(71) Applicant: OMRON CORPORATION, Kyoto (JP)

(72) Inventors: Hideaki Kojima, Kyoto (JP); Ryo Ogura, Kyoto (JP); Mitsunori Sugiura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/627,821

(22) PCT Filed: Feb. 17, 2020

(86) PCT No.: PCT/JP2020/006025
§ 371 (c)(1),
(2) Date: Jan. 18, 2022

(87) PCT Pub. No.: WO2021/038915
PCT Pub. Date: Mar. 4, 2021

(65) Prior Publication Data
US 2022/0278525 A1 Sep. 1, 2022

(30) Foreign Application Priority Data
Aug. 27, 2019 (JP) .............................. JP2019-154452

(51) Int. Cl.
*H02J 3/00* (2006.01)
*H02J 3/38* (2006.01)
(52) U.S. Cl.
CPC .............. *H02J 3/001* (2020.01); *H02J 3/381* (2013.01); *H02J 2300/24* (2020.01)

(58) Field of Classification Search
CPC ........ H02J 3/001; H02J 3/381; H02J 2300/24; G08B 21/187; H02H 7/268; Y02E 60/00; Y04S 10/20
See application file for complete search history.

(56) References Cited

U.S. PATENT DOCUMENTS

2001/0023703 A1  9/2001 Kondo et al.
2013/0320767 A1 12/2013 Huang et al.
(Continued)

FOREIGN PATENT DOCUMENTS

JP   2001-320827 A   11/2001
JP   2006-216660 A    8/2006
(Continued)

OTHER PUBLICATIONS

English translation of the International Search Report of a related international application PCT/JP2020/006024 dated Mar. 31, 2020.
(Continued)

*Primary Examiner* — Toan T Vu
(74) *Attorney, Agent, or Firm* — Metrolex IP Law Group, PLLC

(57) ABSTRACT

A solar power generation network shut-off unit includes a first circuit breaker and second circuit breakers. The first circuit breaker is provided to a power line connecting a plurality of solar power generation modules and a power conditioner in series, and shut-off the supply of power from the solar power generation modules through the power line and transmits an emergency shut-off signal when an emergency shut-off button is pressed. The second circuit breakers are provided to each of a plurality of solar power generation modules, and shut-off the supply of power from the plurality of solar power generation modules through the power line
(Continued)

and transmit a shut-off completion signal to the first circuit breaker when an emergency shut-off signal is received from the first circuit breaker.

21 Claims, 9 Drawing Sheets

(56) References Cited

U.S. PATENT DOCUMENTS

| | | | | |
|---|---|---|---|---|
| 2016/0006392 | A1* | 1/2016 | Hoft | H02H 11/00 |
| | | | | 361/78 |
| 2016/0156308 | A1* | 6/2016 | Alon | H02S 50/00 |
| | | | | 361/679.31 |
| 2016/0372929 | A1 | 12/2016 | Ishikawa | |
| 2017/0373610 | A1 | 12/2017 | White et al. | |

FOREIGN PATENT DOCUMENTS

| | | |
|---|---|---|
| JP | 2013-247787 A | 12/2013 |
| JP | 2013-252046 A | 12/2013 |
| JP | 2014-33587 A | 2/2014 |
| JP | 2016-135016 A | 7/2016 |
| JP | 2016-208635 A | 12/2016 |
| JP | 2017-184355 A | 10/2017 |
| JP | 2018-509868 A | 4/2018 |
| JP | 2019-103209 A | 6/2019 |
| WO | 2015/087638 A1 | 6/2015 |
| WO | 2021/038914 A1 | 3/2021 |
| WO | 2021/038916 A1 | 3/2021 |

OTHER PUBLICATIONS

English translation of the Written Opinion of a related international application PCT/JP2020/006024 dated Mar. 31, 2020.
English translation of the International Search Report of PCT/JP2020/006025 dated Apr. 28, 2020.
English translation of the Written Opinion of PCT/JP2020/006025 dated Apr. 28, 2020.
English translation of the International Search Report of a related international application PCT/JP2020/006253 dated Mar. 31, 2020.
English translation of the Written Opinion of a related international application PCT/JP2020/006253 dated Mar. 31, 2020.

* cited by examiner

SOLAR POWER GENERATION NETWORK SHUT-OFF UNIT AND A SOLAR POWER GENERATION NETWORK SHUT-OFF SYSTEM PROVIDED WITH SAME

TECHNICAL FIELD

The present invention relates to a solar power generation network shut-off unit that shuts off the supply of power between solar power generation modules and a power conditioner, and to a solar power generation network shut-off system provided with the unit.

BACKGROUND ART

Recent years have seen the use of a solar power generation system in which DC voltage is generated by photoelectric conversion in a solar power generation module, and the DC voltage generated in the solar power generation modules is converted into AC voltage by an inverter of a power conditioner, and then outputted.

With a solar power generation system such as this, as shown in Patent Literature 1 and 2, for example, a circuit breaker is provided to shut-off the supply of power from the solar power generation modules during the installation, repair, or maintenance of the solar power generation modules, or in the event of an emergency such as a fire, in order to ensure the safety of workers, firefighters, etc.

CITATION LIST

Patent Literature

Patent Literature 1: JP-A 2019-103209
Patent Literature 2: JP-A 2013-252046

SUMMARY

However, the following problem was encountered with the above-mentioned conventional solar power generation network shut-off system.

With the solar power generation network shut-off systems disclosed in the above-mentioned publications, one circuit breaker (a relay, a control unit, etc.) is provided for each solar power generation module. Therefore, installing all these circuit breakers takes a long time, and the installation cost may increase.

It is an object of the present invention to provide a solar power generation network shut-off unit with which the construction cost can be kept low when installing circuit breakers that operate in an emergency or the like, as well as a solar power generation network shut-off system provided with the unit.

The solar power generation network shut-off unit according to the first invention is a solar power generation network shut-off unit that is disposed between a plurality of solar power generation modules and a power conditioner and that shuts off the supply of power from the solar power generation modules to the power conditioner when an emergency shut-off button is pressed, the unit comprising a first circuit breaker and second circuit breakers. The first circuit breaker is provided to a power line connecting the plurality of solar power generation modules and the power conditioner in series, and, when the emergency shut-off button is pressed, shuts off the supply of power through this power line from the solar power generation modules, and transmits an emergency shut-off signal. One second circuit breaker is provided for a plurality of solar power generation modules and, when the emergency shut-off signal is received from the first circuit breaker, shuts off the supply of power from the plurality of solar power generation modules through the power line, and transmits a shut-off completion signal to the first circuit breaker.

Here, a solar power generation network shut-off unit that is disposed between a plurality of solar power generation modules and a power conditioner and that shuts off the supply of power from the solar power generation modules to the power conditioner when an emergency shut-off button is pressed, comprises a first circuit breaker that shuts off the supply of power when an emergency shut-off button is pressed, and second circuit breakers that shut-off the supply of power from the solar power generation modules and transmit a shut-off completion signal to the first circuit breaker after a shut-off at the first circuit breaker. Here, for example, one first circuit breaker is disposed in the vicinity of the inverter included in the power conditioner, and shuts off the supply of power from the solar power generation modules to the power conditioner.

The second circuit breakers are, for example, disposed in the vicinity of the plurality of solar power generation modules, and are disposed upstream of the first circuit breaker along the power supply path from the solar power generation modules to the power conditioner, and receive an emergency shut-off signal from the first circuit breaker and shut-off the supply of power from the solar power generation modules.

The emergency shut-off button may be provided anywhere in a system in which this solar power generation network shut-off unit is installed and which includes a plurality of solar power generation modules and a power conditioner.

The transfer of emergency shut-off signals and shut-off completion signals between the first circuit breaker and the second circuit breakers may be accomplished by wired communication or by wireless communication such as Wifi (registered trademark).

Consequently, if the emergency shut-off button is pressed in an emergency such as a fire or during repair, maintenance, or the like, for example, the first circuit breaker first shuts off the supply of power from the solar power generation modules to the power conditioner, and transmits an emergency shut-off signal. Then, upon receiving the transmitted emergency shut-off signal, the second circuit breakers shut-off the supply of power from the solar power generation modules to the power conditioner, and also transmit to the first circuit breaker a shut-off completion signal the completion of their own shut-off, which allows it to be recognized on the first circuit breaker side whether or not the second circuit breakers have been shut-off.

As a result, when the emergency shut-off button is pressed, high-voltage power is prevented from being supplied from the solar power generation modules, which ensures the safety of workers and so forth. Also, even if the contact portions of the second circuit breakers should be fused due to the application of a high voltage and cannot be opened or closed, up until an emergency shut-off signal indicating the shut-off completion of the second circuit breaker is received, it will not be determined on the first circuit breaker side that the shut-off of the second circuit breakers is complete even after an emergency shut-off signal has been transmitted, so safety can be further improved.

Furthermore, by using a combination of second circuit breakers that are provided to each of a plurality of solar power generation modules and a first circuit breaker that controls the shut-off of the second circuit breakers, installation costs can be kept lower than with a conventional configuration in which one circuit breaker was provided to each individual solar power generation module.

The solar power generation network shut-off unit according to the second invention is the solar power generation network shut-off unit according to the first invention, wherein the first circuit breaker has a first emergency shut-off determination unit that detects that the emergency shut-off button has been pressed; a first shut-off unit that shuts off the supply of power from the solar power generation modules through the power line; a first shut-off control unit that controls the first shut-off unit so as to shut-off the supply of power when the first emergency shut-off determination unit determines that the emergency shut-off button has been pressed; a first signal receiving unit that receives the shut-off completion signals from the second circuit breakers; and a first shut-off completion determination unit that determines whether or not the shut-off of the second circuit breakers has been completed depending on whether or not the first signal receiving unit has received the shut-off completion signals.

Here, the first emergency shut-off determination unit detects the operation of the emergency shut-off button, the first shut-off control unit controls the shut-off of the first circuit breaker unit depending on whether or not the emergency shut-off button has been pressed, the first signal receiving unit receives from the second circuit breakers a shut-off completion signal indicating the completion of the shut-off of the second circuit breakers, and the first circuit breaker completion determination unit determines whether or not the shut-off of the second circuit breakers is complete.

Consequently, the power supply shut-off operation in the first circuit breaker can be carried out according to the operation status of the emergency shut-off button, and whether or not shut-off on the second circuit breaker side is complete can be recognized on the first circuit breaker side.

The solar power generation network shut-off unit according to the third invention is the solar power generation network shut-off unit according to the second invention, wherein the first circuit breaker further has a display signal output unit that transmits to the power conditioner a display signal that controls a display unit provided to the power conditioner so as to give a display indicating that an emergency shut-off is in progress upon receiving the shut-off completion signals from all of the second circuit breakers.

Here, when shut-off completion signals are received from all of the second circuit breakers constituting the solar power generation network shut-off unit, a message indicating that emergency shut-off is in progress, etc., is displayed on the display unit of the power conditioner.

Consequently, in the event of repair or maintenance, an emergency such as a fire, or the like, workers, firefighters, or the like can check the message displayed on the display unit of the power conditioner before performing their work, etc. Therefore, since the work can be commenced after first confirming shut-off at the first circuit breaker and all the second circuit breakers, high-voltage power supplied from the solar power generation modules can be prevented from being applied to a worker or the like, so safety can be improved.

The solar power generation network shut-off unit according to the fourth invention is the solar power generation network shut-off unit according to the third invention, wherein the display signal output unit transmits to the power conditioner a display signal that controls a display unit provided to the power conditioner so as to give a display indicating that a shut-off error is occurring up until the shut-off completion signals are received from all of the second circuit breakers.

Here, until the shut-off completion signals are received from all of the one or more second circuit breakers, a display signal for causing the display unit of the power conditioner to display a message indicating that a shut-off error is occurring, etc., is transmitted from the first circuit breaker.

Consequently, until the shut-off completion signals are received from all of the second circuit breakers constituting the solar power generation network shut-off unit, a message indicating danger will be displayed on the display unit of the power conditioner, so workers, etc., can postpone their work, or be extra careful, until all the second circuit breakers have been shut-off.

The solar power generation network shut-off unit according to the fifth invention is the solar power generation network shut-off unit according to the fourth invention, wherein, in addition to a display signal indicating that a shut-off error is occurring, the display signal output unit transmits to the power conditioner the address of the second circuit breaker in which the shut-off error is occurring.

Here, in order for a message indicating that a shut-off error is occurring to be displayed on the display unit of the power conditioner, the address of a second circuit breaker that has not been shut-off is transmitted to the power conditioner together with a display signal.

Consequently, a worker or the like can recognize which second circuit breaker is not yet shut-off, together with the message indicating that a shut-off error is in progress displayed on the display unit of the power conditioner. This further improves the safety of workers and the like.

The solar power generation network shut-off unit according to the sixth invention is the solar power generation network shut-off unit according to any of the first to fifth inventions, wherein each second circuit breaker has a second communication unit that receives the emergency shut-off signal and transmits the shut-off completion signal; a second emergency shut-off determination unit that determines whether or not the second communication unit has received the emergency shut-off signal; a second shut-off unit that shuts off the supply of power from the solar power generation modules through the power line; a second shut-off control unit that controls the second shut-off unit so as to shut-off the supply of power when the second communication unit receives the emergency shut-off signal; and a second shut-off completion determination unit that determines the completion of the shut-off of the second shut-off unit.

Here, on the second circuit breaker side, when the second emergency shut-off determination unit determines that an emergency shut-off signal has been received at the second communication unit, the second shut-off control unit controls the second circuit breakers so as to shut-off the supply of power, and the second shut-off completion determination unit determines the completion of the shut-off of the second circuit breakers.

Consequently, when the emergency shut-off button is pressed and an emergency shut-off signal is received from the first circuit breaker side, the supply of power from the solar power generation modules is interrupted on the second circuit breaker side, and when it is determined that shut-off is complete, a shut-off completion signal can be transmitted to the first circuit breaker.

The solar power generation network shut-off unit according to the seventh invention is the solar power generation network shut-off unit according to any of the first to sixth inventions, wherein the second circuit breakers control the second shut-off unit so that the second shut-off control unit shuts off the supply of power after confirming the shut-off state at the first circuit breaker.

Here, the shut-off operation is performed at the second circuit breakers after the shut-off operation at the first circuit breaker.

Consequently, when the emergency shut-off button is pressed, first of all, the first circuit breaker installed on the power conditioner side performs a shut-off operation, after which the second circuit breakers installed on the solar power generation module side perform a shut-off operation, which lowers the voltage applied to the terminal portion when the second circuit breakers are put in an open state, for example.

As a result, the withstand voltage of the second circuit breakers provided to each of the plurality of solar power generation modules can be set low, and this greatly lowers the cost as compared to a configuration in which a circuit breaker with high withstand voltage is provided to each individual solar power generation module.

The solar power generation network shut-off unit according to the eighth invention is the solar power generation network shut-off unit according to the sixth or seventh invention, wherein the second circuit breakers each further have a power supply holding unit for storing the electric power supplied from the solar power generation modules.

Here, the second circuit breakers are each provided with a power holding unit such as a capacitor that can store that power that is supplied from the solar power generation modules and is used to operate the second circuit breakers.

Consequently, the power supplied from the solar power generation modules can be temporarily stored for operating the second circuit breakers without having to provide a power supply on the second circuit breaker side.

The solar power generation network shut-off unit according to the ninth invention is the solar power generation network shut-off unit according to any of the first to eighth inventions, wherein the first circuit breaker and the second circuit breakers transmit and receive the emergency shut-off signal through wired communication.

Here, the transmission and reception of emergency shut-off signals and shut-off completion signals between the first circuit breaker and the second circuit breakers are performed through wired communication such as PLC (power line communication), for example.

This allows emergency shut-off signals and shut-off completion signals to be reliably transmitted and received between the first circuit breaker and the second circuit breakers.

The solar power generation network shut-off unit according to the tenth invention is the solar power generation network shut-off unit according to any of the second to fifth inventions, wherein the first circuit breaker further has a first communication unit that transmits a communication signal to the second circuit breakers, and a first communication control unit that controls the first communication unit so as to continuously transmit the communication signal.

Here, in addition to the shut-off operation at the first circuit breaker and the second circuit breakers using the above-mentioned emergency shut-off signal, on the first circuit breaker side, the first communication control unit controls the first communication unit so as to continuously transmit a communication signal to the second circuit breakers.

Consequently, on the first circuit breaker side, a communication signal for detecting whether or not there is any disconnection can be continuously transmitted.

The solar power generation network shut-off unit according to the eleventh invention is the solar power generation network shut-off unit according to the tenth invention, wherein the second circuit breakers have a signal determination unit that detects that the reception of the communication signal received by the second communication unit has been interrupted; and a disconnection determination unit that determines that there is a disconnection in the power line after a specific length of time has elapsed since the disconnection determination unit has detected an interruption in the reception of the communication signal.

Here, a communication signal that is continuously transmitted from the first circuit breaker to the second circuit breakers is used to detect that a disconnection has occurred in a part of the power line where the first circuit breaker and the second circuit breakers are installed.

Consequently, it can be determined that there is a disconnection after a specific length of time has elapsed since the reception of the communication signal continuously transmitted from the first circuit breaker to the second circuit breakers was interrupted at the second circuit breakers.

The solar power generation network shut-off unit according to the twelfth invention is disposed between a plurality of solar power generation modules and a power conditioner, and shuts off the supply of power from the solar power generation modules to the power conditioner, the solar power generation network shut-off unit comprising a first circuit breaker and second circuit breakers. The first circuit breaker is provided to a power line connecting the plurality of solar power generation modules and the power conditioner in series, shuts off the supply of power through this power line from the solar power generation modules, and continuously transmits a communication signal. One second circuit breaker is provided for a plurality of solar power generation modules, receives the communication signal continuously transmitted from the first circuit breaker, and, when a specific length of time has elapsed since the interruption of the reception of the communication signal, shuts off the supply of power from the plurality of solar power generation modules through the power line, and transmits a shut-off completion signal to the first circuit breaker.

Here, in a solar power generation network breaker unit that is disposed between a plurality of solar power generation modules and a power conditioner and that shuts off the supply of power from the plurality of solar power generation modules to the power conditioner, the first circuit breaker and the second circuit breakers are able to communicate with each other, and once a specific length of time has elapsed since the interruption at the second circuit breakers of the reception of the communication signal continuously transmitted from the first circuit breaker, it is determined that there is a disconnection, and the second circuit breakers shut-off the supply of power from the solar power generation modules.

Here, for example, one first circuit breaker is disposed in the vicinity of an inverter included in the power conditioner, and shuts off the supply of power from the solar power generation modules to the power conditioner.

Also, the second circuit breakers are disposed, for example, in the vicinity of the plurality of solar power generation modules and on the upstream side of the first circuit breaker along the power supply path from the solar power generation modules to the power conditioner. The second circuit breakers then shut-off the supply of power from the solar power generation modules once a specific length of time has elapsed since the reception of the communication signal continuously transmitted from the first circuit breaker was interrupted.

The exchange of communication signals between the first circuit breaker and the second circuit breakers may be accomplished by wired communication or wireless communication such as Wifi (registered trademark).

Consequently, if a part of the power line constituting the system is disconnected in the event of a fire or the like, it is detected that the reception of the communication signal continuously transmitted from the first circuit breaker is interrupted at the second circuit breakers, and once a specific length of time has elapsed since this detection, the supply of power from the solar power generation modules to the power conditioner can be shut-off at the second circuit breakers. When the shut-off of the supply of power from the solar power generation modules to the power conditioner is complete, the second circuit breakers then transmit a shut-off completion signal indicating their own shut-off completion to the first circuit breaker, thereby allowing it to be recognized on the first circuit breaker side whether or not the second circuit breakers have been shut-off.

As a result, it is possible to prevent the application of high-voltage power supplied from the solar power generation modules in the event of a fire or the like, and thereby ensure the safety of firefighters, etc. Also, even if the contact portion of the second circuit breakers should be fused due to the application of a high voltage and cannot be opened or closed, up until a shut-off completion signal indicating shut-off completion is received from the second circuit breakers, it will not be determined on the first circuit breaker side that the shut-off of the second circuit breakers is complete, so safety can be further improved.

Furthermore, by using a combination of second circuit breakers that are provided to each of a plurality of solar power generation modules and a first circuit breaker that controls the shut-off of the second circuit breakers, installation costs can be kept lower than with a conventional configuration in which one circuit breaker was provided to each individual solar power generation module.

The solar power generation network shut-off unit according to the thirteenth invention is the solar power generation network shut-off unit according to the twelfth invention, wherein the first circuit breaker has a first communication unit that transmits the communication signal and receives the shut-off completion signal and a response signal to the communication signal transmitted to the second circuit breakers; a first communication control unit that controls the first communication unit so as to continuously transmit the communication signal; and a response determination unit that determines whether or not the response signal has been received.

Here, the first circuit breaker receives from the second circuit breakers a shut-off completion signal and a response signal to the communication signal continuously transmitted to the second circuit breakers through the first communication unit, and the response determination unit determines whether or not a response signal has been received.

Consequently, whether or not a part of the power line has become disconnected can be determined at the first circuit breaker depending on whether or not a response signal to the communication signal continuously transmitted to the second circuit breaker has been received.

The solar power generation network shut-off unit according to the fourteenth invention is the solar power generation network shut-off unit according to the thirteenth invention, wherein the first circuit breaker further has a display signal output unit that transmits to the power conditioner a display signal that controls a display unit provided to the power conditioner so as to give a display indicating that an emergency shut-off is in progress upon receiving the shut-off completion signals from all of the second circuit breakers.

Here, when shut-off completion signals have been received from all of the second circuit breakers constituting the solar power generation network shut-off unit, a message indicating that emergency shut-off is in progress, etc., is displayed on the display unit of the power conditioner.

Consequently, during the installation, repair, or maintenance of the solar power generation modules, or in the event of an emergency such as a fire, for example, a worker, a firefighter, or the like can check the message displayed on the display unit of the power conditioner before performing work, etc. Therefore, the work can be started after confirming shut-off at the first circuit breaker and all of the second circuit breakers, so the high-voltage power supplied from the solar power generation modules is prevented from being applied to the worker, etc., and safety can be improved.

The solar power generation network shut-off unit according to the fifteenth invention is the solar power generation network shut-off unit according to the fourteenth invention, wherein the display signal output unit transmits to the power conditioner a display signal that controls a display unit provided to the power conditioner so as to give a display indicating that a shut-off error is occurring up until the shut-off completion signals are received from all of the second circuit breakers.

Here, until the shut-off completion signals are received from all of the one or more second circuit breakers, a display signal for displaying on the display unit of the power conditioner a message indicating that a shut-off error is occurring, etc., is transmitted from the first circuit breaker.

Consequently, until shut-off completion signals are received from all of the second circuit breakers constituting the solar power generation network shut-off unit, a message indicating danger is displayed on the display unit of the power conditioner, so a worker, etc., can decide not to perform work, or to be careful, until all the second circuit breakers have been shut-off.

The solar power generation network shut-off unit according to the sixteenth invention is the solar power generation network shut-off unit according to the fifteenth invention, wherein, in addition to a display signal indicating that a shut-off error is occurring, the display signal output unit transmits to the power conditioner the address of the second circuit breaker in which the shut-off error is occurring.

Here, in order to display a message indicating that a shut-off error is occurring on the display unit of the power conditioner, the address of the second circuit breaker that has not yet been shut-off is transmitted to the power conditioner together with the display signal.

Consequently, a worker or the like can recognize which second circuit breaker is not yet shut off, along with the message indicating that a shut-off error is in progress displayed on the display unit of the power conditioner. This further improves the safety of workers and the like.

The solar power generation network shut-off unit according to the seventeenth invention is the solar power generation network shut-off unit according to any of the thirteenth to sixteenth inventions, wherein the second circuit breakers have a second communication unit that receives the communication signal continuously transmitted from the first communication unit and transmits the shut-off completion signal; a signal determination unit that detects that the reception of the communication signal received by the second communication unit has been interrupted; a disconnection determination unit that determines that there is a disconnection in the power line if a specific length of time has elapsed since the signal determination unit detected that the reception of the communication signal has been interrupted; a second shut-off unit that shuts off the supply of power from the solar power generation modules through the power line; a second shut-off control unit that controls the second shut-off unit so as to shut-off the supply of power when the disconnection determination unit has determined that there is a disconnection; and a second shut-off completion determination unit that determines the completion of the shut-off of the second shut-off unit.

Here, on the second circuit breaker side, when the second emergency shut-off determination unit determines that a disconnection has occurred after a specific length of time has elapsed since the reception of the communication signal was interrupted in the second communication unit, the second shut-off control unit controls the second shut-off unit so as to shut-off the supply of power, and the second shut-off completion determination unit determines the shut-off completion of the second shut-off unit.

Consequently, once a specific length of time had elapsed since the reception of the communication signal continuously transmitted from the first circuit breaker side was interrupted, the supply of power from the solar power generation modules is shut-off on the second circuit breaker side, and when it is determined that shut-off is complete, a circuit breaker completion signal can be transmitted to the first circuit breaker.

The solar power generation network shut-off unit according to the eighteenth invention is the solar power generation network shut-off unit according to the seventeenth invention, wherein the second circuit breakers are such that the second shut-off control unit controls the second shut-off unit so as to shut-off the supply of power after the disconnection determination unit has determined that there is a disconnection in the power line and the system including the solar power generation modules is opened.

Here, the shut-off operation in the second circuit breaker is performed after it is determined that there is a disconnection in the first circuit breaker, and the system including the solar power generation modules changes from a closed state to an open state.

Consequently, when a disconnection in the power line is detected in the event of an emergency such as a fire, for example, the second circuit breakers provided on the solar power generation module side perform a shut-off operation after the disconnection is detected.

As a result, since the voltage applied to the terminal portion can be reduced when a plurality of second circuit breakers are opened, for example, second circuit breakers having a lower withstand voltage can be used.

The solar power generation network shut-off unit according to the nineteenth invention is the solar power generation network shut-off unit according to the seventeenth or eighteenth invention, wherein the second circuit breakers further have a power supply holding unit for storing the electric power supplied from the solar power generation modules.

Here, the second circuit breakers are provided with a capacitor or another such power holding unit for storing the power that is supplied from the solar power generation modules and is used to operate the second circuit breakers.

Consequently, the power supplied from the solar power generation modules can be temporarily stored and the second circuit breakers can be operated without having to provide a power supply on the second circuit breaker side.

The solar power generation network shut-off unit according to the twentieth invention is the solar power generation network shut-off unit according to any of the twelfth to nineteenth inventions, wherein the first circuit breaker and the second circuit breakers transmit and receive communication signals through wired communication.

Here, the transmission and reception of communication signals, response signals, and shut-off completion signals between the first circuit breaker and the second circuit breakers are performed through wired communication such as PLC (power line communication).

This allows the transmission and reception of communication signals, response signals, and shut-off completion signals between the first circuit breaker and the second circuit breakers to be carried out reliably.

The solar power generation network shut-off system according to the twenty-first invention comprises the solar power generation network shut-off unit according to any of the first to twentieth claims; a plurality of solar power generation modules; a power conditioner; a power line; and an emergency shut-off button.

The effect of using a system configuration comprising the above-mentioned solar power generation network shut-off unit is that the safety of workers and the like can be ensured, and the installation cost when installing circuit breakers that operate in an emergency, etc., can be reduced.

Effects

With the solar power generation network shut-off unit according to the present invention, the installation cost can be reduced when installing circuit breakers that operate in an emergency, etc.

DESCRIPTION OF EMBODIMENTS

Figure 1:
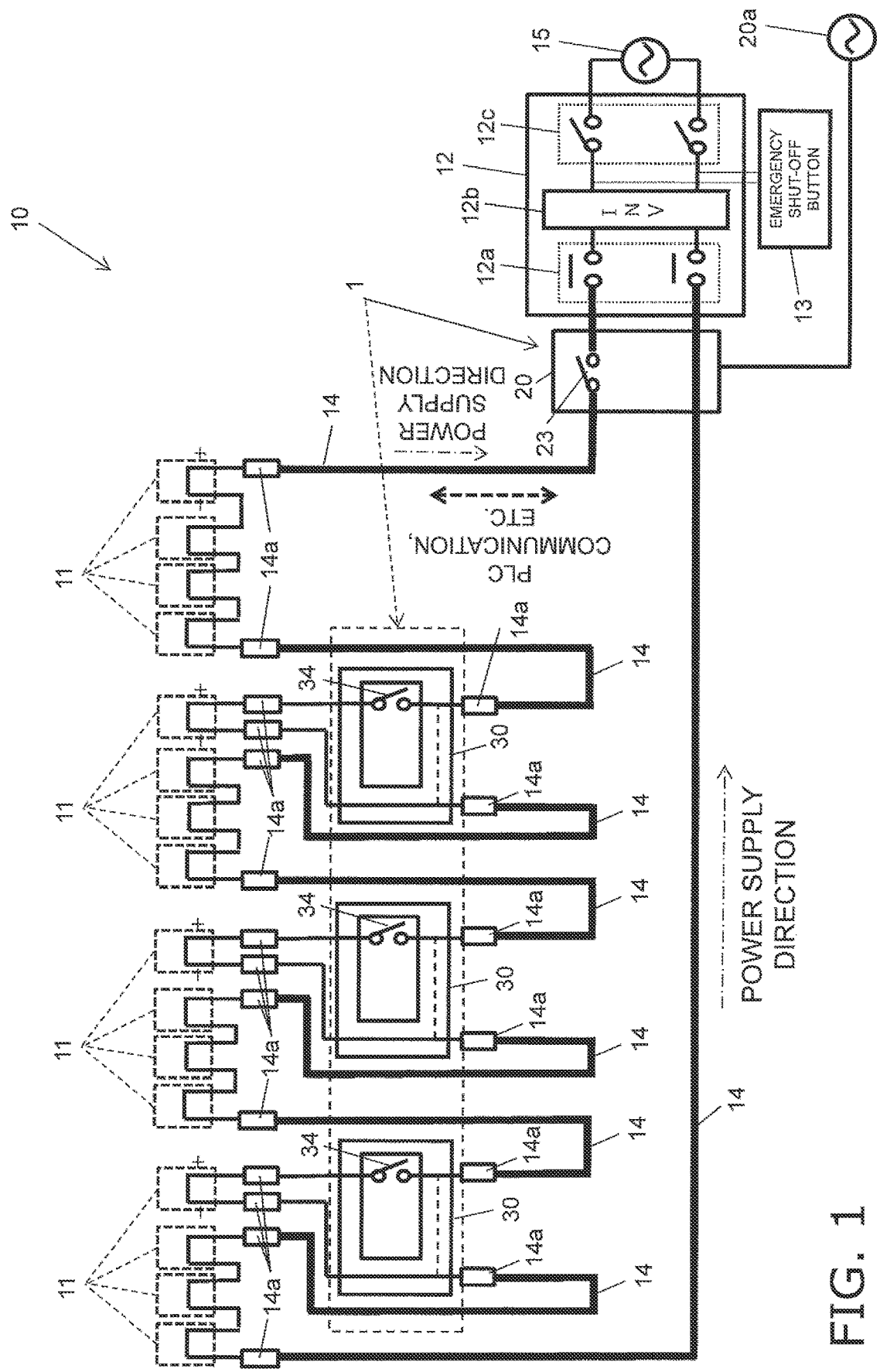
FIG. 1 is a system block diagram of the configuration of the solar power generation network shut-off system according to an embodiment of the present invention.

A solar power generation network shut-off system 10 including a solar power generation network shut-off unit 1 according to an embodiment of the present invention will now be described with reference to FIGS. 1 to 9.

In the following description, "upstream side" and "downstream side" refer to the upstream side and the downstream side in the power supply direction in which the power generated by photoelectric conversion in solar power generation modules 11 is supplied to a power conditioner 12.

(1) Configuration of Solar Power Generation Network Shut-Off System 10

The solar power generation network shut-off system 10 of this embodiment shuts off the supply of power from a plurality of the solar power generation modules 11 to the power conditioner 12 in an emergency, etc., for example, in a solar power generation network in which power generated by photoelectric conversion in the solar power generation modules 11 is supplied to a commercial power system 15 or a load device. More specifically, the solar power generation network shut-off system 10 is disposed between the solar power generation modules 11 and the power conditioner 12, and when the emergency shut-off button 13 is pressed, or when disconnection occurs in a part of the power line 14, the supply of power from the solar power generation modules 11 to the power conditioner 12 is shut-off.

With a solar power generation network in which the solar power generation network shut-off system 10 is installed, the electric power generated by photoelectric conversion in the solar power generation modules 11 is supplied to the power conditioner 12 through the power line 14, which is connected via a plurality of connectors 14a. Then, as shown in FIG. 1, the power conditioner 12 converts DC power into AC power via a relay 12a, an inverter 12b, and a relay 12c, and this power is supplied to the commercial power system 15 or a load device.

Here, possible scenarios in which the emergency shut-off button 13 would be pressed by a person are, for example, a case in which installation, replacement, maintenance, or other such work is performed on the solar power generation modules 11, or a case in which there is an emergency such as a fire.

Also, a possible scenario in which disconnection would occur in a part of the power line 14 is a case in which there is deterioration of or an accident with the solar power generation network system, or there is an emergency such a fire, for example.

When the emergency shut-off button 13 is pressed or a disconnection occurs, high-voltage power supplied from the solar power generation modules 11 to the downstream side must be shut-off in order to ensure the safety of workers, firefighters, and the like.

Therefore, as shown in FIG. 1, the solar power generation network shut-off system 10 comprises the solar power generation network shut-off unit 1, the solar power generation modules 11, the power conditioner 12, the emergency shut-off button 13, and the power line 14.

The solar power generation network shut-off unit 1 comprises a single first circuit breaker 20 that functions as a master unit, and a plurality of second circuit breakers 30 that function as slave units. The first circuit breaker 20 and the second circuit breakers 30 are connected so as to be able to communicate with each other through PLC (power line communication) or the like.

As shown in FIG. 1, one first circuit breaker 20 is installed in the solar power generation network shut-off system 10, and is disposed on the power line 14, downstream from the plurality of solar power generation modules 11 and the plurality of second circuit breakers 30, and just upstream from the power conditioner 12.

Consequently, the first circuit breaker 20 can shut-off the supply of power before the power supplied from the solar power generation modules 11 is supplied to the power conditioner 12.

Also, as shown in FIG. 1, the first circuit breaker 20 is driven by power supplied from an AC power supply 20a. When the emergency shut-off button 13 is pressed, the first circuit breaker 20 shuts off the supply of power through the power line 14 by moving the shut-off unit 23 from its closed state to its open state.

The detailed configuration of the first circuit breaker 20 will be described in detail below.

As shown in FIG. 1, a plurality of second circuit breakers 30 are provided to each of a plurality of (four in this embodiment) solar power generation modules 11. The second circuit breakers 30 are disposed on the power line 14, just downstream from the solar power generation modules 11 and on the upstream side of the first circuit breaker 20.

Consequently, the second circuit breakers 30 can shut-off the power supplied from the solar power generation modules 11 on the upstream side of the first circuit breaker 20.

Also, as shown in FIG. 1, the second circuit breakers 30 are driven by being supplied with the power generated by photoelectric conversion in the solar power generation modules 11. The second circuit breakers 30 are controlled by various kinds of signal transmitted from the first circuit breaker 20. More specifically, the second circuit breakers 30 shut-off the supply of power through the power line 14 by moving the shut-off unit 34 from its closed state to its open state when an emergency shut-off signal is received from the first circuit breaker 20, or when a specific length of time has elapsed since the alive signal (communication signal) continuously transmitted from the first circuit breaker 20 was last received (that is, when disconnection is detected).

The detailed configuration of the second circuit breaker 30 will be described in detail below.

The solar power generation modules 11 include a typical solar power generation panel that generates DC power by photoelectric conversion from sunlight, and has a built-in bypass diode, for example.

The power conditioner 12 converts the DC power generated by the solar power generation modules 11 into AC power and outputs this DC power to the commercial power system 15, a load device, or the like. As shown in FIG. 1, the power conditioner 12 comprises a relay 12a, an inverter 12b, and a relay 12c. The DC power generated by the solar power generation modules 11 into AC power by the inverter 12b, and this AC power is outputted to the commercial power system 15 or the like.

Figure 2:
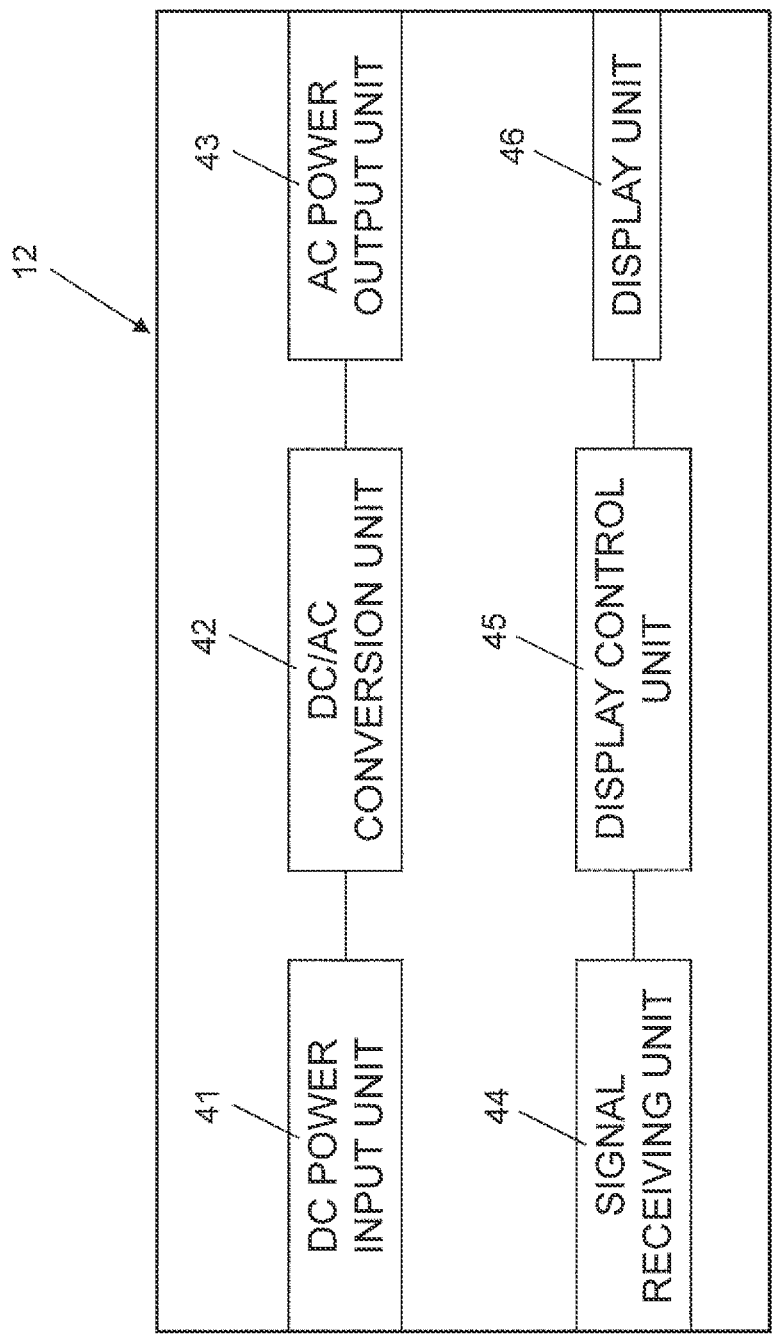
FIG. 2 is a block diagram of the configuration of the power conditioner included in the solar power generation network shut-off system in FIG. 1.

More specifically, as shown in FIG. 2, the power conditioner 12 comprises a DC power input unit 41, a DC/AC conversion unit 42, and an AC power output unit 43.

Consequently, the DC power supplied from the solar power generation modules 11 is inputted to the DC power input unit 41 and converted into AC power by the DC/AC conversion unit 42, and can then be outputted from the AC power output unit 43.

The power conditioner 12 further comprises a signal receiving unit 44 that receives a display control signal from the first circuit breaker 20 when emergency shut-off processing is executed by the first circuit breaker 20 (discussed below), a display control unit 45 that performs control so as to display a message indicating that emergency shut-off is in progress, etc., and a display unit 46 whose display is controlled by the display control unit 45.

The configuration of the power conditioner 12 is a typical configuration, and will therefore not be described in detail herein.

The emergency shut-off button 13 is disposed near the power conditioner 12, and is pressed by a worker performing repair or the like, a firefighter in the event of a fire, etc., to transmit an emergency shut-off button pressing signal to the first circuit breaker 20.

Consequently, the first circuit breaker 20 can execute emergency shut-off processing (discussed below) by receiving the emergency shut-off button pressing signal indicating that the emergency shut-off button 13 has been pressed.

The power line 14 serially connects the solar power generation modules 11 to each other, and also serially connects the solar power generation modules 11 and the power conditioner 12, and transmits the power supplied from the solar power generation modules 11 to the power conditioner 12. The power line 14 is also used as an electric wire for transmitting the alive signal and the emergency shut-off signal transmitted from the first circuit breaker 20 to the second circuit breakers 30 by using PLC (power line communication).

As shown in FIG. 1, the power line 14 directly connects the solar power generation modules 11 and the power conditioner 12, so when there is a disconnection in a part of the power line 14, for example, the supply of power is impossible, and the transmission and reception of an alive signal (discussed below) also becomes impossible.

(2) Solar Power Generation Network Shut-Off Unit 1

The solar power generation network shut-off unit 1 of this embodiment is disposed between the solar power generation modules 11 and the power conditioner 12, and is installed in order to shut-off the supply of power from the solar power generation modules 11 to the power conditioner 12 when the emergency shut-off button 13 is pressed, or when a disconnection is detected in a part of the power line 14.

More specifically, in the solar power generation network shut-off unit 1 of this embodiment, when the emergency shut-off button 13 is pressed, the shut-off unit 23 inside the first circuit breaker 20 enters its shut-off state, and an emergency shut-off signal is transmitted from the first circuit breaker 20 to the second circuit breakers 30, which puts the shut-off units 34 in the second circuit breakers 30 into a shut-off state.

Furthermore, in the solar power generation network shut-off unit 1 of this embodiment, the alive signal continuously transmitted from the first circuit breaker 20 is received at the second circuit breakers 30, and if a specific length of time has elapsed without the reception of the alive signal at the second circuit breakers 30, it is determined that a disconnection has occurred in a part of the power line 14, and the shut-off units 34 in the second circuit breaker 30 is put in a shut-off state.

As shown in FIG. 1, the solar power generation network shut-off unit 1 comprises the first circuit breaker 20 and the second circuit breakers 30.

(2-1) First Circuit Breaker 20

Figure 3:
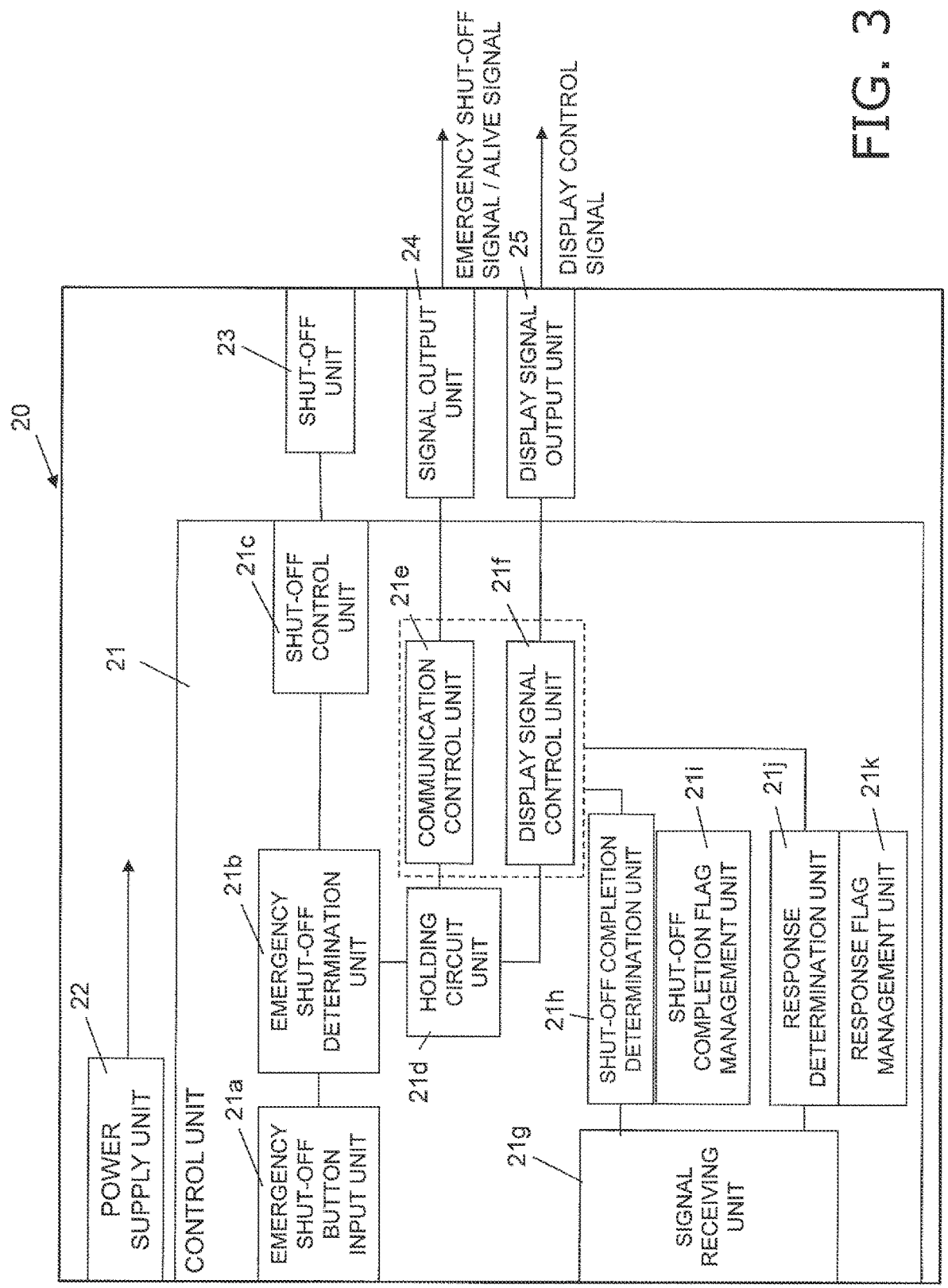
FIG. 3 is a block diagram of the configuration of a first circuit breaker constituting the solar power generation network shut-off unit included in the solar power generation network shut-off system in FIG. 1.

As shown in FIG. 1, the first circuit breaker 20 is disposed on the power line 14, just upstream from the power conditioner 12, and as shown in FIG. 3, has a control unit 21, a power supply unit 22, a shut-off unit (first shut-off unit) 23, a signal output unit (first communication unit) 24, and a display signal output unit 25.

The control unit 21 controls the components in the first circuit breaker 20, and as shown in FIG. 3, has an emergency shut-off button input unit 21a, an emergency shut-off determination unit (first emergency shut-off determination unit) 21b, a shut-off control unit (first shut-off control unit) 21c, a holding circuit unit 21d, a communication control unit (first communication control unit) 21e, a display signal control unit 21f, a signal receiving unit (first signal receiving unit) 21g, a shut-off completion determination unit (first shut-off completion determination unit) 21h, a shut-off completion flag management unit 21i, a response determination unit 21j, and a response flag management unit 21k.

The emergency shut-off button input unit 21a receives the emergency shut-off button pressing signal that is transmitted when the emergency shut-off button 13 is pressed, and transfers the received information to the downstream side.

The emergency shut-off determination unit (first emergency shut-off determination unit) 21b is connected to the emergency shut-off button input unit 21a, and determines whether or not an emergency shut-off button pressing signal has been inputted to the emergency shut-off button input unit 21a.

The shut-off control unit (first shut-off control unit) 21c is connected to the emergency shut-off determination unit 21b, and when the emergency shut-off determination unit 21b receives an emergency shut-off button pressing signal, moves the shut-off unit 23 from its closed state to its open state. This allows the shut-off control unit 21c to control the shut-off unit 23 so as to shut-off the supply of power through the power line 14.

The holding circuit unit 21d is connected to the emergency shut-off determination unit 21b, and when an emergency shut-off button pressing signal is received, the holding circuit unit 21d performs timer control of the emergency shut-off signal transmitted from the first circuit breaker 20 in order to put the second circuit breakers 30 into their shut-off state. That is, when the holding circuit unit 21d receives the emergency shut-off button pressing signal, a delay time is set for transmitting an emergency shut-off signal to the second circuit breakers 30 after a specific hold period has elapsed since the reception, and this delay time is sent to the communication control unit 21e.

The communication control unit (first communication control unit) 21e is connected to the holding circuit unit 21d, and when it is determined by the emergency shut-off determination unit 21b that the emergency shut-off button 13 has been pressed, the signal output unit 24 is controlled so as to transmit an emergency shut-off signal to the second circuit breakers 30 at the point when the delay time set in the holding circuit unit 21d has elapsed.

Also, the communication control unit 21e controls the transmission timing, time interval, etc., of the alive signal used for wire disconnection detection that is transmitted to the second circuit breakers 30 at specific time intervals.

The display signal control unit 21f is connected to the holding circuit unit 21d, and when it is determined by the emergency shut-off determination unit 21b that the emergency shut-off button 13 has been pressed, the display signal output unit 25 is controlled so as to output a display control signal to the signal receiving unit 44 of the power conditioner 12 at the point when the delay time set in the holding circuit unit 21*d* has elapsed.

Also, the display signal control unit 21*f* is connected to the shut-off completion determination unit 21*h*, and when it is determined by the shut-off completion determination unit 21*h* that a shut-off completion signal has been received from all of the second circuit breakers 30, the display signal output unit 25 is controlled so as to output to the signal receiving unit 44 of the power conditioner 12 a display control signal for displaying a message indicating that an emergency shut-off is in progress.

Figure 7B:
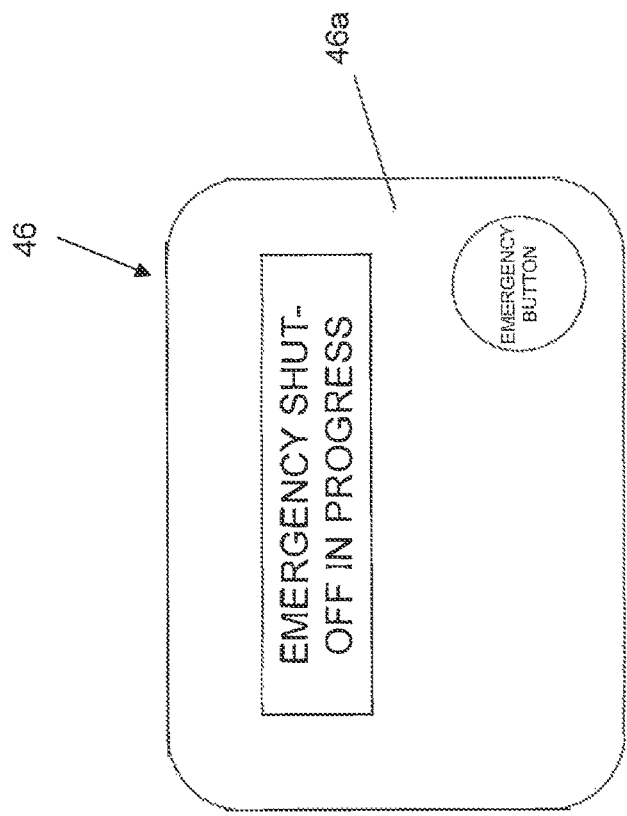
FIG. 7b is a diagram showing the display screen of the display unit of the power conditioner when the emergency shut-off button is pressed and the first circuit breaker and the second circuit breakers change to a shut-off state.
Figure 7A:
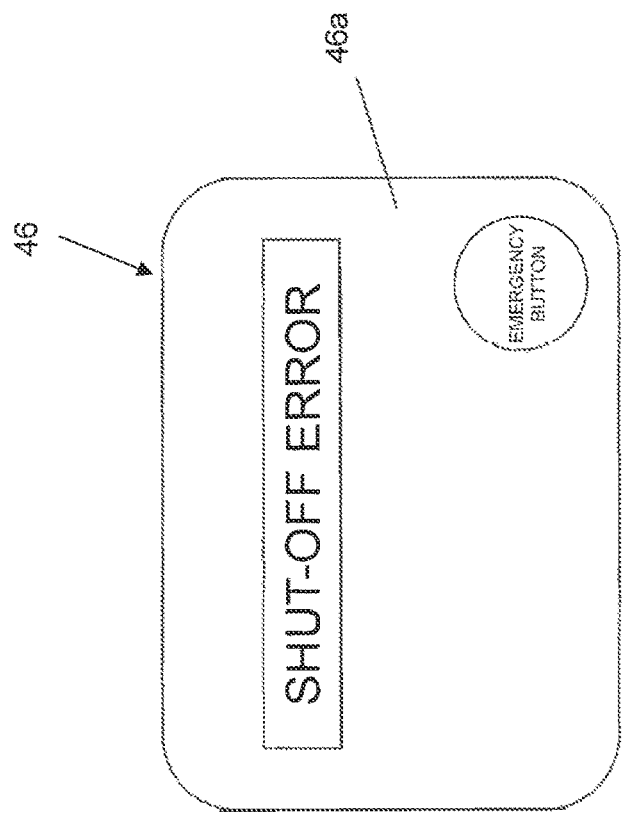
FIG. 7a is a diagram showing the display screen of the display unit of the power conditioner up until the emergency shut-off is pressed and the first circuit breaker and all of the second circuit breakers change to a shut-off state.

At this point, until a shut-off completion signal is received from all of the second circuit breakers 30, the display signal control unit 21*f* transmits to the signal receiving unit 44 of the power conditioner 12 the address of the second circuit breaker 30 at which a shut-off error is occurring, along with a display control signal for displaying the message shown in FIG. 7*a* indicating that there is a shut-off error.

Consequently, until the first circuit breaker 20 receives a shut-off completion signal from all of the second circuit breakers 30, the location (address) of the second circuit breaker 30 where the shut-off error is occurring can be displayed, along with a message indicating that there is a shut-off error, on the display unit 46 of the power conditioner 12. Then, when the first circuit breaker 20 receives a shut-off completion signal from all of the second circuit breakers 30, a message indicating that emergency shut-off is in progress can be displayed on the display unit 46 of the power conditioner 12.

Consequently, workers, firefighters, etc., can check message displayed on the display unit 46 of the power conditioner 12, and confirm the location of the second circuit breaker 30 in which the shut-off error has occurred, and can recognize whether or not the supply of power has been shut-off, or if the power has not been shut-off, the location, etc.

As a result, the safety of workers, firefighters, etc., can be further improved.

The signal receiving unit (first signal receiving unit) 21*g* receives the shut-off completion signals transmitted from the second circuit breakers 30, and receives the response signals from the second circuit breakers 30 to the alive signal that is continuously transmitted from the signal output unit 24 at specific intervals.

The shut-off completion determination unit (first shut-off completion determination unit) 21*h* determines whether or not shut-off is complete at the second circuit breakers 30 that have transmitted shut-off completion signals, depending on whether or not the signal receiving unit 21*g* has received shut-off completion signals from the second circuit breakers 30.

The shut-off completion flag management unit 21*i* stores the state of the shut-off completion flag of the second circuit breakers 30 for which shut-off has been completed.

The response determination unit 21*j* determines whether or not there is a response from the second circuit breakers 30 that have transmitted a response signal, depending on whether or not the signal receiving unit 21*g* has received response signals from the second circuit breakers 30.

The response flag management unit 21*k* stores the state of the response flag of the second circuit breakers 30 that have received a response signal.

As shown in FIG. 1, the power supply unit 22 is connected to the AC power supply 20*a*, performs AC/DC conversion or DC/DC conversion, and supplies power to the components constituting the first circuit breaker 20.

The shut-off unit (first shut-off unit) 23 is provided in the first circuit breaker 20 as a circuit breaker capable of shutting off the entire system voltage of the solar power generation network shut-off system 10. The shut-off unit 23 then switches the shut-off state at the first circuit breaker 20 by controlling the opening and closing according to the signal transmitted from the shut-off control unit 21*c*.

The signal output unit (first communication unit) 24 is connected to the communication control unit 21*e*, and an emergency shut-off signal is outputted to the second circuit breakers 30 at the point when the delay time set in the holding circuit unit 21*d* has elapsed, on the basis of a command from the communication control unit 21*e*.

Also, the signal output unit 24 transmits an alive signal to the second circuit breakers 30 at the transmission timing and the specific time intervals set by the holding circuit unit 21*d* and the communication control unit 21*e*.

The display signal output unit 25 is connected to the display signal control unit 21*f*, and outputs a display control signal and the like to the power conditioner 12 in response to a command from the display signal control unit 21*f*.

Consequently, with the display unit 46 of the power conditioner 12, the shut-off unit 23 is in its shut-off state in the first circuit breaker 20, and after shut-off completion signals have been received from the second circuit breakers 30, a message such as "emergency shut-off in progress" can be displayed (see FIG. 7*b*).

As a result, the second circuit breakers 30 can change to their shut-off state after a specific length of time has elapsed since the first circuit breaker 20 went into its shut-off state, so the voltage applied to the contact portion when the second circuit breakers 30 change to their shut-off state can be reduced as compared with the first circuit breaker 20. Consequently, the second circuit breakers 30 can have a withstand voltage lower than that of the first circuit breaker 20, so the cost of the solar power generation network shut-off unit 1 can be greatly reduced.

Also, compared to a configuration in which one circuit breaker is provided for each individual solar power generation module 11, a configuration is used in which one second circuit breaker 30 is provided for four of the solar power generation modules 11, so the installation cost can be reduced.

Furthermore, the display unit 46 of the power conditioner 12 displays a message indicating that there is a shut-off error and the location of the second circuit breaker 30 where the shut-off error has occurred until all the second circuit breakers 30 are in their shut-off state, and also displays a message indicating that emergency shut-off is in progress once the second circuit breakers 30 change to their shut-off state. Therefore, safety can be further improved by urging care when a worker, a firefighter, or the like enters the site in a state in which a second circuit breaker 30 has not yet changed to its shut-off state.

(2-2) Second Circuit Breaker 30

Figure 4:
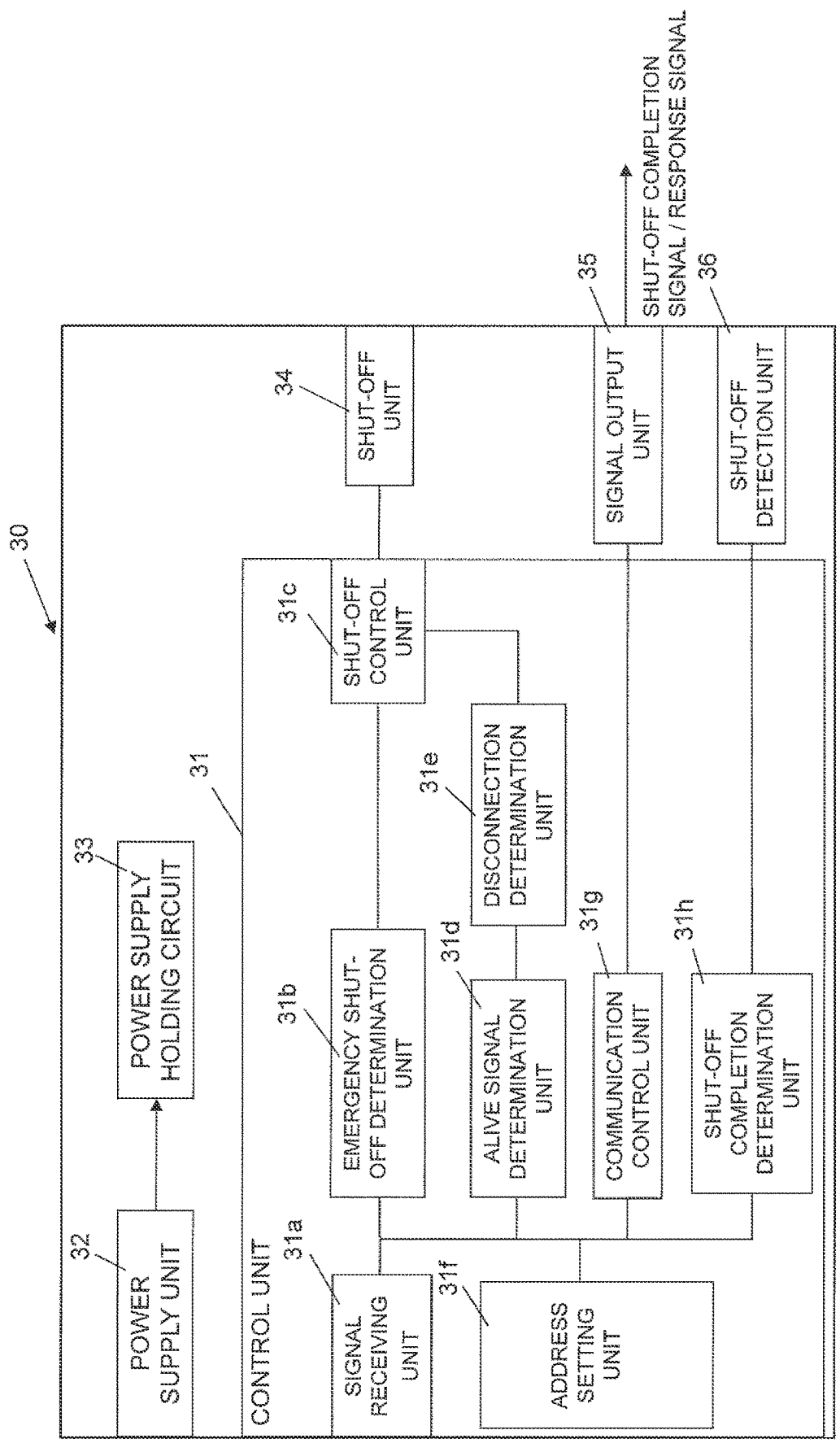
FIG. 4 is a block diagram showing the configuration of a second circuit breaker constituting the solar power generation network shut-off unit included in the solar power generation network shut-off system in FIG. 1.

As shown in FIG. 1, the second circuit breakers 30 are disposed on the power line 14, just downstream from the solar power generation modules 11, one for every four solar power generation modules 11. As shown in FIG. 4, the second circuit breakers 30 each have a control unit 31, a power supply unit 32, a power supply holding circuit (power supply holding unit) 33, a shut-off unit (second shut-off unit) 34, a signal output unit 35, and a shut-off detection unit 36.

The control unit 31 has a signal receiving unit (second communication unit) 31*a*, an emergency shut-off determination unit (second emergency shut-off determination unit) 31*b*, a shut-off control unit (second shut-off control unit)

31c, an alive signal determination unit (signal determination unit) 31d, a disconnection determination unit 31e, an address setting unit 31f, a communication control unit 31g, and a shut-off completion determination unit (second shut-off completion determination unit) 31h.

The signal receiving unit (second communication unit) 31a receives the emergency shut-off signal and the alive signal outputted from the signal output unit 24 of the first circuit breaker 20, and transfers these to the downstream side.

The emergency shut-off determination unit (second emergency shut-off determination unit) 31b is connected to the signal receiving unit 31a, and determines whether or not an emergency shut-off signal has been received from the first circuit breaker 20.

The shut-off control unit (second shut-off control unit) 31c is connected to the emergency shut-off determination unit 31b and the disconnection determination unit 31e, receives the determination results from the emergency shut-off determination units 31b and 31e, and controls the shut-off unit 34 so as to switch between a shut-off state or not a shut-off state.

The alive signal determination unit (signal determination unit) 31d is connected to the signal receiving unit 31a, and determines the reception status of the alive signal that is continuously received from the first circuit breaker 20 at specific time intervals. More specifically, the alive signal determination unit 31d determines whether or not the reception of the alive signal, which should be continuously received from the first circuit breaker 20 at specific time intervals, has been interrupted.

The disconnection determination unit 31e is connected to the alive signal determination unit 31d, receives the determination result from the alive signal determination unit 31d, and determines whether or not a disconnection has occurred in a part of the power line 14. More specifically, the disconnection determination unit 31e determines that a disconnection has occurred when there is still no reception even after the elapse of a specific length of time since the interruption of the reception of the alive signal that should be continuously received from the first circuit breaker 20 at specific time intervals.

The address setting unit 31f stores the individual addresses of the second circuit breakers 30, which are set in advance.

The communication control unit 31g controls the signal output unit 35 so as to transmit a response signal to the first circuit breaker 20 on the basis of the determination results of the alive signal determination unit 31d and the disconnection determination unit 31e. Also, the communication control unit 31g controls the signal output unit 35 so as to transmit a shut-off completion signal indicating that shut-off in the second circuit breakers 30 is complete, on the basis of the determination result in the shut-off completion determination unit 31h.

The shut-off completion determination unit (second shut-off completion determination unit) 31h receives a detection signal indicating the shut-off state in the second circuit breakers 30 from the shut-off detection unit 36, and determines whether or not shut-off of the second circuit breakers 30 is complete.

The power supply unit 32 subjects the DC power supplied from the solar power generation modules 11 to DC/DC conversion, and supplies power to the components constituting the second circuit breakers 30.

The power supply holding circuit (power holding holding unit) 33 is, for example, a capacitor, which stores the DC power that is supplied from the solar power generation modules 11 and has undergone DC/DC conversion as energy for driving the second circuit breakers 30 for a set period of time.

The shut-off unit (second shut-off unit) 34 is provided to the second circuit breakers 30 as a circuit breaker capable of shutting off the supply of power from the solar power generation modules 11 included in the solar power generation network shut-off system 10 to the downstream side. The shut-off units 34 then switch the shut-off state in the second circuit breakers 30 by controlling the opening and closing according to the signal transmitted from the shut-off control unit 31c.

The signal output unit 35 is controlled by the communication control unit 31g so as to transmit a shut-off completion signal to the first circuit breaker 20 and a response signal to the alive signal.

The shut-off detection unit 36 is provided in order to detect whether or not the shut-off unit 34 in the second circuit breakers 30 is properly shut-off when an emergency shut-off signal is received or when disconnection is detected due to the non-reception of the alive signal.

With the solar power generation network shut-off unit 1 of this embodiment, as described above, on the second circuit breaker 30 side, it is detected whether or not the shut-off units 34 are properly shut-off, and if it is detected that the shut-off units 34 have been properly shut-off, a shut-off completion signal is transmitted to the first circuit breaker 20.

Also, when a specific length of time has elapsed since the interruption of the reception of the alive signal continuously transmitted from the first circuit breaker 20, it is determined that a part of the power line 14 has been disconnected, and control is performed so that the shut-off unit 34 will be shut-off.

Consequently, when the emergency shut-off button 13 is pressed, the shut-off units 34 of the second circuit breakers 30 can be shut-off by the reception of the emergency shut-off signal transmitted from the first circuit breaker 20. It is then determined that a disconnection has occurred if a specific length of time has elapsed since the interruption of the reception of the alive signal continuously transmitted from the first circuit breaker 20, and the shut-off units 34 of the second circuit breakers 30 can be shut-off.

Furthermore, in this embodiment, when it is detected that the shut-off units 34 of the second circuit breakers 30 have been properly shut-off, it can be confirmed whether or not each of the second circuit breakers 30 has been properly shut-off at the first circuit breaker 20 by transmitting a circuit breaker completion signal from each second circuit breaker 30 to the first circuit breaker 20.

As a result, even if the contact portion is fused as a result of repeated application of high voltage in the shut-off unit 34 of the second circuit breaker 30 and cannot change to its open state, for example, since a message is displayed on the display unit 46 of the power conditioner 12 after confirmation of the proper shut-off state and receipt of a shut-off completion signal at the second circuit breaker 30, the safety of workers, firefighters, and the like can be further improved.

Emergency Shut-Off Control by Solar Power Generation Network Shut-Off Unit 1

With the solar power generation network shut-off unit 1 of this embodiment, because of the above configuration, when the emergency shut-off button 13 is pressed, the first circuit breaker 20 puts the shut-off unit 23 in its open state and shuts off the supply of power at the first circuit breaker 20, and transmits an emergency shut-off signal to the second circuit breakers 30 to put shut-off units 34 of the second circuit breakers 30 in their open state and shut-off the supply of power at the second circuit breakers 30.

The emergency shut-off control performed by the solar power generation network shut-off unit 1 of this embodiment will now be described using the timing chart shown in FIG. 5.

Figure 5:
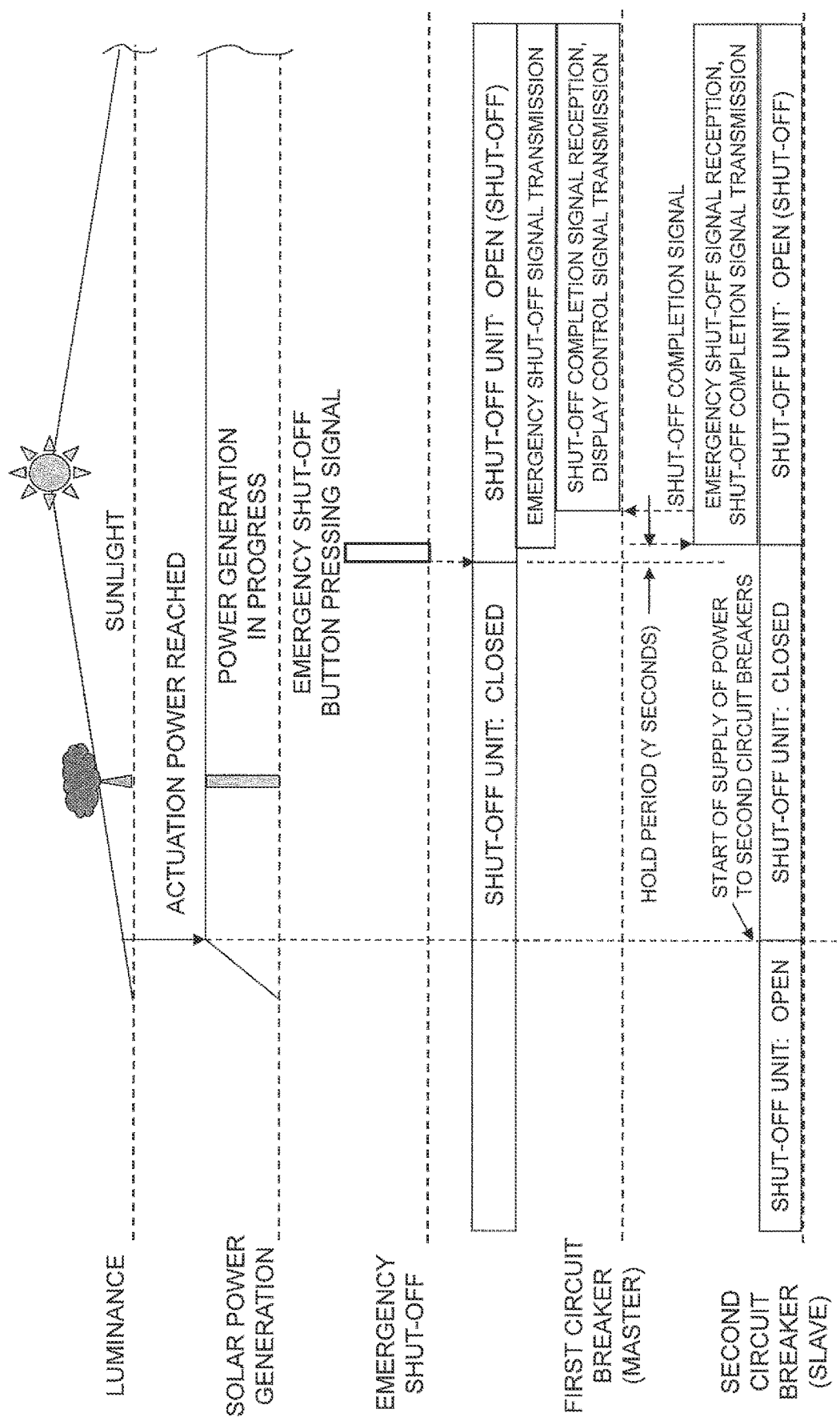
FIG. 5 is a timing chart showing the operation of the parts constituting the solar power generation network shut-off system of FIG. 1 when the emergency shut-off button is pressed.

FIG. 5 shows the power generation status in the solar power generation modules 11 according to the intensity (luminance) of sunlight, the pressing of the emergency shut-off button 13, the transmission and reception of signals at the first circuit breaker 20 and the second circuit breakers 30, and the states of the shut-off units 23 and 34 along with the elapsed time.

As shown in FIG. 5, in the plurality of solar power generation modules 11, once the amount of power generation reaches a specific actuation power due to increased luminance as the sun rises after sunrise, the supply of power is begun to the second circuit breakers 30, which are driven by the power supplied from the solar power generation modules 11. At this point, the actuated second circuit breakers 30 switch their shut-off units 34 from the open state to the closed state, and power is supplied from the solar power generation modules 11 to the power conditioner 12.

Since the first circuit breaker 20 receives power from the power supply unit 22 regardless of whether or not there is any solar power generation, the shut-off unit 23 remains closed.

Consequently, when the second circuit breakers 30 change to their closed state due to the supply of power from the solar power generation modules 11, the first circuit breaker 20 and the second circuit breakers 30 are both closed, so power can be supplied from the solar power generation modules 11 to the power conditioner 12.

Although the solar power generation module 11 can supply the power required to drive the second circuit breakers 30 during the time of day when the sunlight is strong and the luminance is high, if the weather becomes cloudy or rainy, for example, there is a risk that supply of the required power will be temporarily impossible, as shown in FIG. 5.

However, with the solar power generation network shut-off unit 1 of this embodiment, since the second circuit breakers 30 comprise the power supply holding circuit 33, even if the sky temporarily clouds over and the amount of power supplied from the solar power generation modules 11 decreases, power can still be supplied from the power supply holding circuits 33 to operate the second circuit breakers 30.

Next, when the emergency shut-off button 13 is pressed during repair or maintenance work, in an emergency, etc., as shown in FIG. 5, at the first circuit breaker 20, the emergency shut-off determination unit 21*b* determines whether or not an emergency shut-off button pressing signal has been received by the emergency shut-off button input unit 21*a*, indicating that the emergency shut-off button 13 has been pressed.

At this point, since the emergency shut-off button input unit 21*a* is receiving the emergency shut-off button pressing signal, the shut-off control unit 21*c* switches the shut-off unit 23 from its closed state to its open state, and puts the first circuit breaker 20 in a shut-off state.

After this, at the first circuit breaker 20, when the shut-off unit 23 changes to the shut-off state and a specific hold period (Y seconds) elapses, an emergency shut-off signal is transmitted to the second circuit breakers 30.

At the second circuit breakers 30, when the signal receiving units 31*a* receive the emergency shut-off signal, the emergency shut-off determination units 31*b* determine that the emergency shut-off signal has been received, and the shut-off control units 31*c* control the shut-off units 34 so as to change from the closed state to the open state.

Consequently, following the transition of the shut-off unit 23 of the first circuit breaker 20 to the shut-off state, the shut-off units 34 of the second circuit breakers 30 can also be changed to the shut-off state.

As a result, the withstand voltage of the second circuit breakers 30 provided to each of a plurality of solar power generation modules 11 can be made lower than that of the first circuit breaker 20, so the cost can be greatly reduced as compared to a configuration in which one circuit breaker with a high withstand voltage is provided to each individual solar power generation module 11.

Also, compared to a configuration in which one circuit breaker is provided for each individual solar power generation module 11, in this configuration one second circuit breaker 30 is provided for four solar power generation modules 11, so the installation cost can be reduced.

Also, with the second circuit breakers 30, when proper shut-off is completed in the shut-off units 34, shut-off completion signals are transmitted to the first circuit breaker 20.

When the first circuit breaker 20 receives circuit breaker completion signals from all of the second circuit breakers 30, a display control signal for displaying a message indicating that emergency shut-off is in progress is transmitted to the power conditioner 12.

Consequently, at the power conditioner 12, when the signal receiving unit 44 receives the display control signal transmitted from the first circuit breaker 20, the display control unit 45 controls the display unit 46 so as to display the message "Emergency shut-off in progress" on the display screen 46*a* shown in FIG. 7*b*.

Therefore, in a state in which the shut-off units 23 and 34 have changed to the shut-off state in the first circuit breaker 20 and the second circuit breakers 30, a message indicating that emergency shut-off is in progress can be displayed on the display screen 46*a* of the display unit 46 of the power conditioner 12.

As a result, the user can look at the display screen 46*a* of the display unit 46 of the power conditioner 12 to confirm that emergency shut-off processing is completed in the first circuit breaker 20 and the second circuit breakers 30, and this ensures the safety of workers in the event of repairs, etc., and firefighters in the event of a fire, etc.

In the example shown in FIG. 5, the first circuit breaker 20 receives circuit breaker completion signals from the second circuit breakers 30 and then transmits a display control signal to the power conditioner 12, but instead, for example, a display control signal for displaying a message indicating a shut-off error may be transmitted to the power conditioner 12 after an emergency shut-off has been transmitted by the first circuit breaker 20 to the second circuit breakers 30.

In this case, the first circuit breaker 20 may transmit a display control signal for displaying a message indicating shut-off error until shut-off completion signals have been received from all of the second circuit breakers 30, and may transmit a display control signal for displaying a message indicating that emergency shut-off is in progress upon receiving shut-off completion signals from all of the second circuit breakers 30.

Shut-Off Control when Disconnection is Detected by Solar Power Generation Network Shut-Off Unit 1

With the solar power generation network shut-off unit 1 of this embodiment, in the above configuration, it is determined that a disconnection has occurred if a specific hold period (Y seconds) has elapsed since the last time the second circuit breakers 30 received an alive signal that is continuously transmitted from the first circuit breaker 20 to the second circuit breakers 30 at specific time intervals, in which case the shut-off units 34 of the second circuit breakers 30 are put in their open state and the supply of power at the second circuit breakers 30 is shut-off.

The disconnection detection and shut-off control performed by the solar power generation network shut-off unit 1 of this embodiment will now be described using the timing chart shown in FIG. 6.

Figure 6:
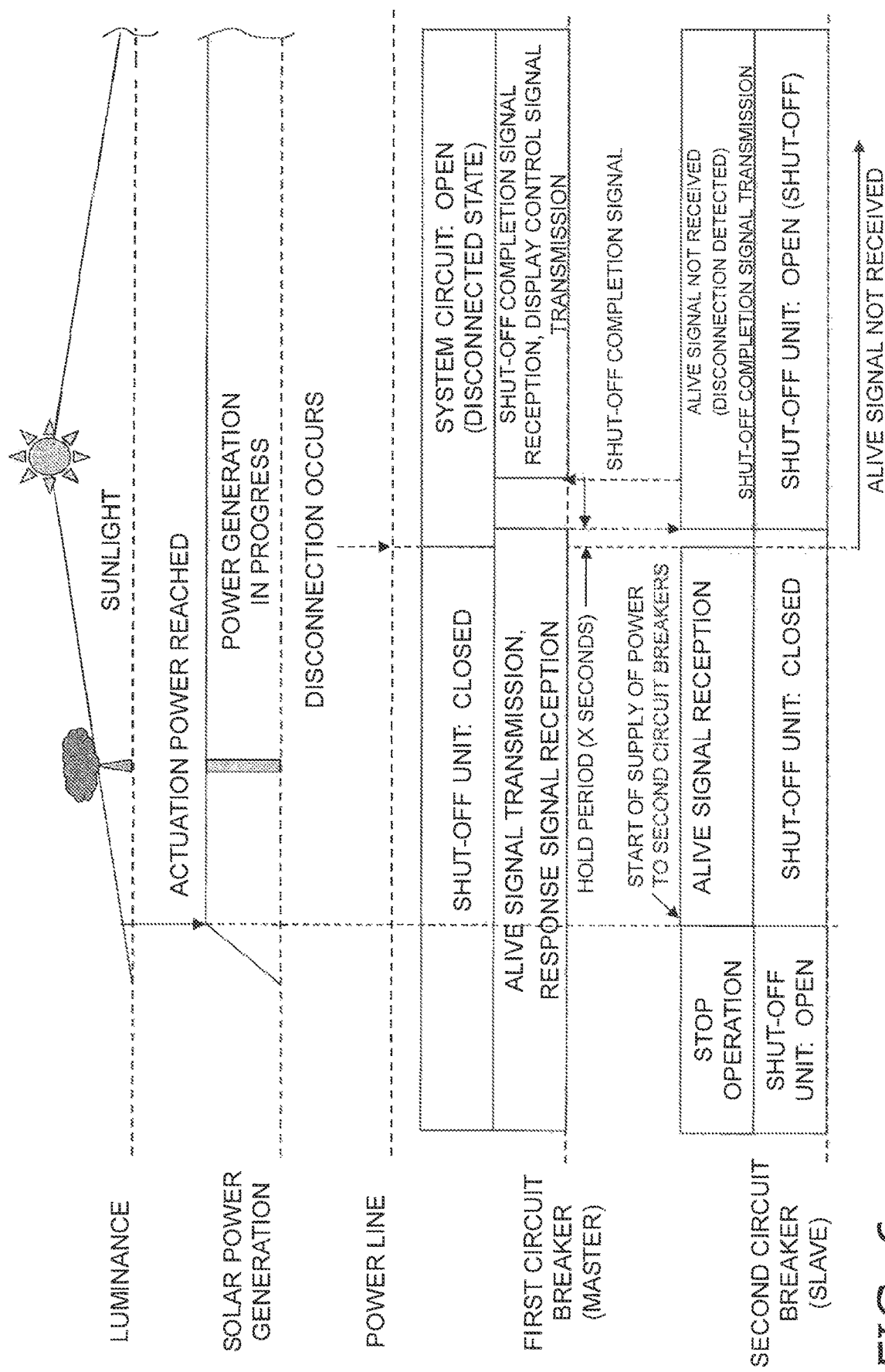
FIG. 6 is a timing chart showing the operation of the parts constituting the solar power generation network shut-off system of FIG. 1 when a disconnection has occurred.

FIG. 6 shows the power generation status in the solar power generation modules 11 according to the intensity (luminance) of sunlight, whether or not a disconnection has occurred in the power line 14, the transmission and reception of signals at the first circuit breaker 20 and the second circuit breakers 30, and the state of the shut-off units 23 and 34 along with the elapsed time.

Since the relation between the power generation status of the solar power generation modules 11 and the supply of power to the second circuit breakers 30 is the same as that in FIG. 5 described above, it will not be described again here.

When in an actuated state, the first circuit breaker 20 continuously transmits an alive signal to the second circuit breakers 30 at specific time intervals.

Then, when the second circuit breakers 30 are actuated by the supply of power from the solar power generation modules 11, the signal receiving units 31a receive the alive signal continuously transmitted from the first circuit breaker 20.

Here, if a disconnection occurs in a part of the power line 14, as shown in FIG. 6, the alive signal continuously transmitted from the first circuit breaker 20 cannot be received by the second circuit breakers 30. More specifically, if the power line 14 is normal, the signal receiving units 31a of the second circuit breakers 30 cannot receive the alive signal that is supposed to be received at specific time intervals.

At this point, in the first circuit breaker 20, the shut-off unit 23 has not changed to its open state, but since the solar power generation modules 11 and the power conditioner 12 are connected in series, the system circuit is in an open state. Consequently, when viewed from the second circuit breakers 30, this state is almost the same as the state in which the shut-off unit 23 is open in the first circuit breaker 20.

On the other hand, with the second circuit breakers 30, if a specific hold period (Y seconds) has elapsed since the alive signal determination unit 31d determined that no alive signal has been received, the disconnection determination unit 31e determines that a disconnection has occurred in a part of the power line 14.

Consequently, the shut-off control unit 31c can control the shut-off units 34 so that the shut-off units 34 change from their closed state to their open state. Then, following the detection of the disconnection that occurred in a part of the power line 14, the shut-off units 34 can also be changed to the shut-off state in the second circuit breakers 30.

That is, the second circuit breakers 30 can be put in a shut-off state after it is detected that the system circuit including the solar power generation modules 11 and the power conditioner 12 is in an open state due to a disconnection of the power line 14.

As a result, the withstand voltage of the second circuit breakers 30, which are provided to each of a plurality of solar power generation modules 11, can be made lower than that of the first circuit breaker 20, so the cost can be greatly reduced as compared with a configuration in which one circuit breaker with high withstand voltage is provided for each individual solar power generation module 11.

Furthermore, compared to a configuration in which one circuit breaker is provided for each individual solar power generation module 11, in this configuration the second circuit breakers 30 are provided to each of four solar power generation modules 11, so the installation cost can be reduced.

When shut-off is complete in the shut-off units 34 of the second circuit breaker 30, the second circuit breakers 30 transmit shut-off completion signals to the first circuit breaker 20.

When the first circuit breaker 20 receives a circuit breaker completion signal from all of the second circuit breakers 30, a display control signal for displaying a message indicating that emergency shut-off is in progress is transmitted to the power conditioner 12.

Consequently, in the power conditioner 12, when the signal receiving unit 44 receives the display control signal transmitted from the first circuit breaker 20, the display control unit 45 controls the display unit 46 so as to display a message of "Emergency shut-off in progress" on the display screen 46a shown in FIG. 7b.

Therefore, in the state in which the shut-off units 23 and 34 have changed to the shut-off state in the first circuit breaker 20 and the second circuit breakers 30, a message indicating that emergency shut-off is in progress can be displayed on the display screen 46a of the display unit 46 of the power conditioner 12.

As a result, the user can look at the display screen 46a of the display unit 46 of the power conditioner 12 to confirm that emergency shut-off processing is completed in the first circuit breaker 20 and the second circuit breakers 30, and this ensures the safety of workers in the event of repairs, etc., and firefighters in the event of a fire, etc.

In the example shown in FIG. 6, just as in the example shown in FIG. 5, the first circuit breaker 20 receives the circuit breaker completion signals from the second circuit breakers 30, and then transmits a display control signal to the power conditioner 12.

However, for example, a display control signal for displaying the message that there is a shut-off error (shown in FIG. 7a) may be transmitted to the power conditioner 12 at the point when it is detected that the first circuit breaker 20 has yet to receive a response signal has not been received from a second circuit breaker 30.

In this case, the first circuit breaker 20 may transmit a display control signal for displaying a message indicating that there is a shut-off error until the shut-off completion signals have been received from all of the second circuit breakers 30, and may transmit a display control signal for displaying a message indicating that emergency shut-off is in progress upon receiving shut-off completion signals from all of the second circuit breakers 30.

In the solar power generation network shut-off unit 1 of this embodiment, as described above, the first circuit breaker 20 and the plurality of second circuit breakers 30 are able to communicate with each other, so it is not determined that shut-off on the second circuit breaker 30 side is complete until a shut-off completion signal has been received from each of the second circuit breakers 30.

Consequently, even if a high voltage is repeatedly applied to the shut-off unit 34 of a certain second circuit breaker 30 and, as a result, fusion occurs at the contact portion and prevents a change to the open state, for example, since a message is displayed on the display unit 46 of the power conditioner 12 after the proper shut-off state has been confirmed in the second circuit breaker 30 and a shut-off completion signal has been received, the safety of workers, firefighters, or the like can be further improved.

Shut-Off Flow in Solar Power Generation Network Shut-Off Unit 1

The shut-off flow carried out in the solar power generation network shut-off unit 1 of this embodiment will now be described through reference to the flowcharts shown in FIGS. 8 and 9.

Figure 8:
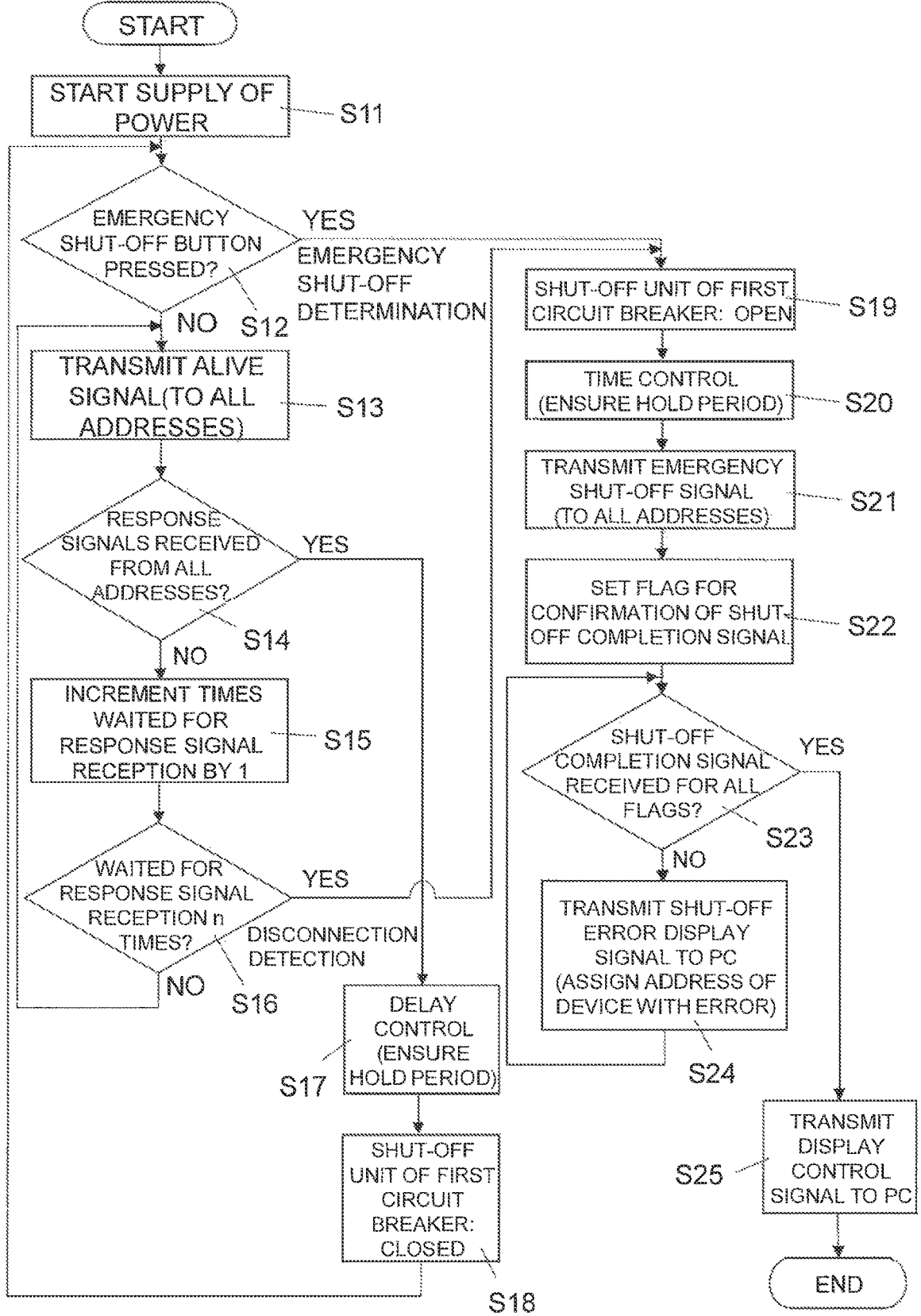
FIG. 8 is a flowchart showing the control flow in the first circuit breaker constituting the solar power generation network shut-off unit included in the solar power generation network shut-off system of FIG. 1.
Figure 9:
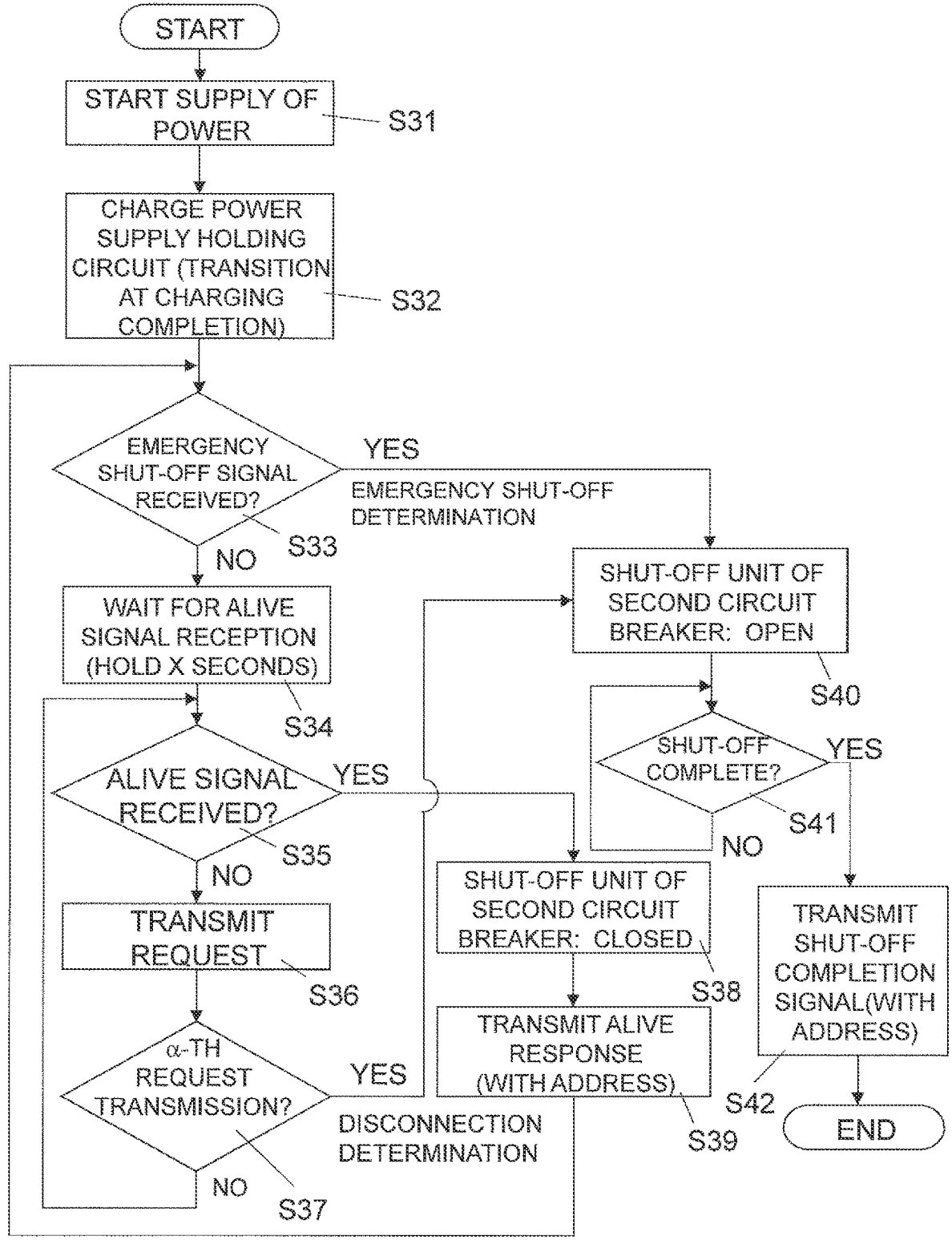
FIG. 9 is a flowchart showing the control flow in the second circuit breaker constituting the solar power generation network shut-off unit included in the solar power generation network shut-off system of FIG. 1.

FIG. 8 shows the processing in the first circuit breaker 20, and FIG. 9 shows the processing in the second circuit breakers 30.

Processing in First Circuit Breaker 20

As shown in FIG. 8, in the processing on the first circuit breaker 20 side, first, when the supply of power to the first circuit breaker 20 is started in step S11, whether or not the emergency shut-off button 13 has been pressed is monitored in step S12.

If the button has not been pressed, the processing proceeds to step S13, and if the button has been pressed, the processing proceeds to step S19.

Next, in step S13, since it was determined in step S12 that the emergency shut-off button 13 was not pressed, the communication control unit 21e controls the signal output unit 24 to transmit an alive signal to the addresses of all the second circuit breakers 30.

Next, in step S14, it is determined whether or not the signal receiving unit 21g of the first circuit breaker 20 has received response signals from all of the second circuit breakers 30 (all addresses) for the transmitted alive signal.

Here, if response signals have not been received from all of the second circuit breakers 30, the processing proceeds to step S15, and if response signals have been received from all of the second circuit breakers 30, the processing proceeds to step S17.

Next, in step S15, since it was determined in step S14 that response signals have not been received from all of the second circuit breakers 30, the system goes into a state of waiting for a response signal, and the number of times of waiting for reception is incremented by +1.

Next, in step S16, it is determined whether or not the number of times of waiting for reception of a response signal is a preset upper limit value of n times.

Here, if it is not the n-th time, the processing goes back to step S13 in order to return to the state of waiting for the receipt of response signals from all of the second circuit breakers 30. On the other hand, if the n-th time has been reached, it is determined that at least a specific length of time has elapsed since the last response signal was received, it is determined that a disconnection has occurred, and the processing proceeds to step S19.

Next, in step S17, since it was determined in step S14 that response signals had been received from all of the second circuit breakers 30, it is determined that there is no abnormality such as operation of an emergency shut-off signal or detection of a disconnection, and the communication control unit 21e again controls the signal output unit 24 so that an alive signal is transmitted on the basis of a delay time set in the holding circuit unit 21d.

Next, in step S18, since it was determined in steps S12 and S14 that there was no abnormality, shut-off unit 23 of the first circuit breaker 20 is left closed, and the system returns to monitoring the operation of the emergency shut-off button 13 in step S12.

On the other hand, in step S19, since it was determined in step S12 that the emergency shut-off button 13 was pressed, the shut-off unit 23 is immediately switched from its closed state to its open state, and the first circuit breaker 20 goes into a shut-off state.

More precisely, when the emergency shut-off determination unit 21b determines that an emergency shut-off button pressing signal has been inputted to the emergency shut-off button input unit 21a, the shut-off control unit 21c immediately changes the shut-off unit 23 to a shut-off state.

Next, in step S20, if the specific hold period (Y seconds) set in the holding circuit unit 21d has elapsed since the communication control unit 21e put the shut-off unit 23 of the first circuit breaker 20 in an open state (shut-off state), the signal output unit 24 is controlled so as to transmit an emergency shut-off signal to all of the second circuit breakers 30.

Next, in step S21, an emergency shut-off signal is transmitted from the signal output unit 24 to all of the second circuit breakers 30 (all addresses).

Next, in step S22, the shut-off completion flag management unit 21i sets a confirmation flag in order to confirm that shut-off completion signals have been received from all of the second circuit breakers 30.

Next, in step S23, it is determined whether or not shut-off completion signals have been received from all of the second circuit breakers 30.

Here, if it is determined that the shut-off completion signals have not been received from all of the second circuit breakers 30, the processing proceeds to step S24, but if it is determined that shut-off completion signals have been received from all of the second circuit breakers 30, the processing proceeds to step S25.

Next, in step 24S, since it was determined in step S23 that shut-off completion signals had not been received from all of the second circuit breakers 30, the display signal control unit 21f controls the display signal output unit 25 so that a display control signal including an address for displaying the position of the second circuit breaker 30 in which the shut-off error has occurred is transmitted to the display unit 46 of the power conditioner (PC) 12 together with the message that there is a shut-off error. Then, the processing goes back to step S23, and it is determined whether or not shut-off completion signals have been received from all of the second circuit breakers 30.

Consequently, in the processing of steps S23 and S24, if there is a second circuit breaker 30 for which a shut-off completion signal has not been received repeatedly, the message indicating a shut-off error and the position of the second circuit breaker 30 in which the shut-off error occurred are left displayed on the display unit 46 of the power conditioner 12.

On the other hand, in step S25, since it was determined in step S23 that shut-off completion signals had been received from all of the second circuit breakers 30, the display signal control unit 21f controls the display signal output unit 25 so as to transmit to the power conditioner 12 a display control signal for displaying a message indicating that emergency shut-off is in progress on the display unit 46 of the power conditioner (PC) 12.

The above steps S11 to S25 conclude the processing in the first circuit breaker 20.

Processing in Second Circuit Breakers 30

As shown in FIG. 9, in the processing on the second circuit breaker 30 side, first, when the supply of power from the solar power generation modules 11 is started in step S31, the power supply holding circuit 33 is charged with power in step S32. Then, when the charging of the power supply holding circuit 33 is complete, the processing proceeds to step S33.

Next, in step S33, it is determined whether or not an emergency shut-off signal has been received from the first circuit breaker 20.

Here, if no signal has been received, the processing proceeds to step S34, and if a signal has been received, the processing proceeds to step S37 in order to carry out the emergency shut-off processing.

Next, in step S34, since it was determined in step S33 that an emergency shut-off signal had not been received, the system waits a hold period of x seconds until the alive signal continuously transmitted from the first circuit breaker 20 is received continuously at specific intervals.

Next, in step S35, it is determined whether or not an alive signal has been received from the first circuit breaker 20 in order to confirm whether a disconnection has occurred in a part of the power line 14.

Here, if no signal has been received, it is determined that there is a possibility of disconnection, and the processing proceeds to step S36. If a signal has been received, the processing proceeds to step S38.

Next, in step S36, since it was determined in step S35 that the alive signal had not been received, a request signal prompting the first circuit breaker 20 to transmit an alive signal is transmitted.

Next, in step S37, it is determined whether or not the transmission of the request signal to the first circuit breaker 20 is the a-th time, which is a preset threshold value.

Here, if it is not the a-th transmission, the processing returns to step S35 and waits again for an alive signal to be received. On the other hand, if it is the a-th transmission, the disconnection determination unit 31e determines that a disconnection has occurred in a part of the power line 14, and processing proceeds to step S38.

Next, in step S38, since it was determined in step S35 that the alive signal had been received, it is determined that there is no abnormality, and the shut-off units 34 of the second circuit breakers 30 are left in the closed state.

Next, in step S39, an address is assigned to each second circuit breaker 30, a response signal to the alive signal is transmitted, and the processing returns to monitoring the reception of the emergency shut-off signal in step S33.

Next, in step S40, since some kind of abnormality has occurred, such as when it was determined in step S33 that an emergency shut-off signal had been received, or when it was determined in step S37 that a disconnection had occurred, the shut-off units 34 of the second circuit breakers 30 are switched from their closed state to their open state, and the second circuit breakers 30 are put in the shut-off state.

Next, in step S41, it is determined whether or not shut-off is complete in the shut-off units 34 of the second circuit breakers 30. More specifically, the shut-off completion determination unit 31h determines whether or not the shut-off detection unit 36 has detected the shut-off of the shut-off units 34, and waits until it is determined that shut-off is complete.

Next, in step S42, after completion of the shut-off of the shut-off units 34, a shut-off completion signal to which an address was assigned for the second circuit breakers 30 is transmitted to the first circuit breaker 20, and the processing on the second circuit breaker 30 side is ended.

Main Features

As described above, the solar power generation network shut-off unit 1 of this embodiment is a device that is disposed between the plurality of solar power generation modules 11 and the power conditioner 12, and that shuts off the supply of power from the solar power generation modules 11 to the power conditioner 12 when the emergency shut-off button 13 is pressed, the device comprising the first circuit breaker 20 and the second circuit breakers 30. The first circuit breaker 20 is provided on the power line 14 that connects the solar power generation modules 11 and the power conditioner 12 in series, and when the emergency shut-off button 13 is pressed, shuts off the supply of power from the solar power generation modules 11 through the power line 14, and transmits an emergency shut-off signal. The second circuit breakers 30 are each provided to each of a plurality of solar power generation modules 11, and when an emergency shut-off signal is received from the first circuit breaker 20, shut-off the supply of power from the solar power generation modules 11 through the power line 14, and also transmit a shut-off completion signal to the first circuit breaker 20.

Consequently, when the emergency shut-off button 13 is pressed in an emergency such as a fire, or for the purpose of repair, maintenance, etc., for example, first, the first circuit breaker 20 shuts off the supply of power from the solar power generation modules 11 to the power conditioner 12, and transmits an emergency shut-off signal. Then, upon receiving the transmitted emergency shut-off signal, the second circuit breakers 30 shut-off the supply of power from the solar power generation modules 11 to the power conditioner 12, and transmit shut-off completion signals indicating their own shut-off completion to the first circuit breaker 20, which makes it possible to confirm on the first circuit breaker 20 side whether or not the second circuit breakers 30 have been shut-off.

As a result, when the emergency shut-off button 13 is pressed, it is possible to prevent the high-voltage power supplied from the solar power generation modules 11 from being applied, and this ensures the safety of workers and so forth. Also, even if the contact portion of a second circuit breaker 30 is fused due to the application of a high voltage and cannot be opened or closed, until circuit breaker completion signals indicating the completion of shut-off are received from the second circuit breakers 30, even after an emergency shut-off signal is transmitted, it will not be determined on the first circuit breaker 20 side that shut-off of the second circuit breakers 30 is complete, which further improves safety.

Furthermore, by using a combination of the second circuit breakers 30, which are provided to each of a plurality of solar power generation modules 11, and the first circuit breaker 20, which controls shut-off in the second circuit breakers 30, the installation cost can be reduced compared to a conventional configuration in which one circuit breaker is provided for each individual solar power generation module 11.

As described above, the solar power generation network shut-off unit 1 of this embodiment is a device that is disposed between the plurality of solar power generation modules 11 and the power conditioner 12, and that shuts off the supply of power from the solar power generation modules 11 to the power conditioner 12, the device comprising a first circuit breaker 20 and second circuit breakers 30. The first circuit breaker 20 is provided on a power line 14 that connects the plurality of solar power generation modules 11 and the power conditioner 12 in series, and shuts off the supply of power from the solar power generation modules 11 through the power line 14, and also continuously transmits an alive signal. The second circuit breakers 30 are provided to each of a plurality of solar power generation modules 11, receive the alive signal continuously transmitted from the first circuit breaker 20, shut-off the supply of power from the solar power generation modules 11 through the power line 14 once a specific length of time has elapsed since the reception of the alive signal was interrupted, and transmit a shut-off completion signal to the first circuit breaker 20.

Consequently, when there is a disconnection in a part of the power line 14 constituting the system in the event of a fire or the like, for example, it is detected that the reception of the alive signal continuously transmitted from the first circuit breaker 20 is interrupted in the second circuit breakers 30, and if a specific length of time elapses since this detection, the supply of power from the solar power generation modules 11 to the power conditioner 12 can be shut-off in the second circuit breakers 30. Then, when the shut-off of the supply of power from the solar power generation modules 11 to the power conditioner 12 is completed, the second circuit breakers 30 transmit a shut-off completion signal indicating that their own shut-off is completed to the first circuit breaker 20, and it can be recognized on the first circuit breaker 20 side whether or not the second circuit breakers 30 have been shut-off.

As a result, it is possible to prevent the application of the high-voltage power supplied from the solar power generation modules 11 in the event of a fire or the like, and this ensures the safety of firefighters and so forth. Also, even if the contact portion of a second circuit breaker 30 is fused due to the application of a high voltage and cannot be opened or closed, until a shut-off completion signal indicating the completion of shut-off is received from the second circuit breaker 30, it will not be determined on the first circuit breaker 20 side that the second circuit breakers 30 have been shut-off, and this further improves safety.

Furthermore, by using a combination the second circuit breakers 30, which are provided to each of a plurality of solar power generation modules 11, and the first circuit breaker 20, which controls shut-off in the second circuit breakers 30, the installation cost can be reduced compared to a conventional configuration in which one circuit breaker is provided for each individual solar power generation module 11.

Other Embodiments

An embodiment of the present invention was described above, but the present invention is not limited to or by the above embodiment, and various modifications are possible without departing from the gist of the invention.

(A)

In the above embodiment, an example was given in which emergency shut-off control, in which the shut-off unit 23 and the shut-off units 34 were shut-off in that order in the first circuit breaker 20 and the second circuit breakers 30 by an emergency shut-off operation signal transmitted when the emergency shut-off button 13 was pressed, was combined with disconnection detection shut-off control, in which a state of not having received an alive signal was detected to detect disconnection of the power line 14, and the shut-off units 34 were shut-off in the second circuit breakers 30, but the present invention is not limited to this.

For instance, the solar power generation network shut-off unit may carry out either emergency shut-off control or disconnection detection shut-off control.

(B)

In the above embodiment, an example was given in which the first circuit breaker 20 functioning as a master unit was disposed at a position adjacent to the upstream side of the power conditioner 12 in the supply direction of the power supplied from the solar power generation modules 11, but the present invention is not limited to this.

For instance, the system may be configured such that the first circuit breaker functioning as the master unit is installed in a state of being integrated with the power conditioner.

Alternatively, the first circuit breaker may be disposed anywhere within the system so long as it is on the upstream side of the inverter included in the power conditioner of the solar power generation network shut-off system.

(C)

In the above embodiment, an example was given in which the emergency shut-off button 13, which was pressed during repair or maintenance or in the event of an emergency such as a fire, and which shut-off the supply of power from the solar power generation modules 11, was connected to the power conditioner 12, but the present invention is not limited to this.

For instance, the emergency shut-off button may be provided anywhere within the solar power generation network shut-off system.

(D)

In the above embodiment, an example was given in which the second circuit breakers 30 were actuated by being supplied with power generated by the solar power generation modules 11, but the present invention is not limited to this.

For instance, the configuration may be such that a power supply device is provided inside the second circuit breakers, or the configuration may be such that drive is by the power supplied from the first circuit breaker or the power conditioner side.

(E)

In the above embodiment, an example was given in which the second circuit breakers 30 comprised the power supply holding circuit 33 that temporarily stored the power supplied from the solar power generation modules 11, but the present invention is not limited to this.

For instance, if the configuration is such that a power supply device is provided inside the second circuit breakers as mentioned above, or the configuration is such that drive is by the power supplied from the first circuit breaker or the power conditioner side, the second circuit breaker does not have to have a power supply holding circuit.

(F)

In the above embodiment, an example was given of a system configuration in which one second circuit breaker 30 was installed for four solar power generation modules 11, but the present invention is not limited to this.

For instance, the system configuration may be such that one second circuit breaker is provided for two or three solar power generation modules, or the system configuration may be such that one second circuit breaker is provided for five or more solar power generation modules.

(G)

In the above embodiment, an example was given in which emergency shut-off signals and alive signals were transmitted and received between the first circuit breaker 20 and the second circuit breakers 30 via the power line 14, but the present invention is not limited to this.

For instance, the transmission and reception of emergency shut-off signals and alive signals between the first circuit breaker and the second circuit breakers are not limited to wired communication, and may be accomplished, for example, by wireless communication such as Wifi (registered trademark).

INDUSTRIAL APPLICABILITY

The solar power generation network shut-off unit of the present invention has the effect of reducing the installation cost when installing circuit breakers that operate in an emergency or the like, and is therefore widely applicable to solar power generation systems that include circuit breakers.

REFERENCE SIGNS LIST 1 solar power generation network shut-off unit
10 solar power generation network shut-off system
11 solar power generation module
12 power conditioner
12a relay
12b inverter
12c relay
13 emergency shut-off button
14 power line
14a connector
15 commercial power system
20 first circuit breaker
20a AC power supply
21 control unit
21a emergency shut-off button input unit
21b emergency shut-off determination unit (first emergency shut-off determination unit)
21c shut-off control unit (first shut-off control unit)
21d holding circuit unit
21e communication control unit (first communication control unit)
21f display signal control unit
21g signal receiving unit (first signal receiving unit)
21h shut-off completion determination unit (first shut-off completion determination unit)
21i shut-off completion flag management unit
21j response determination unit
21k response flag management unit
22 power supply unit
23 shut-off unit (first shut-off unit)
24 signal output unit (first communication unit)
25 display signal output unit
30 second circuit breaker
31 control unit
31a signal receiving unit (second communication unit)
31b emergency shut-off determination unit (second emergency shut-off determination unit)
31c shut-off control unit (second shut-off control unit)
31d alive signal determination unit (signal determination unit)
31e disconnection determination unit
31f address setting unit
31g communication control unit
31h shut-off completion determination unit (second shut-off completion determination unit)
32 power supply unit
33 power supply holding circuit (power supply holding unit)
34 shut-off unit (second shut-off unit)
35 signal output unit
36 shut-off detection unit
41 DC power input unit
42 DC/AC conversion unit
43 AC power output unit
44 signal receiving unit
45 display control unit
46 display unit
46a display screen

The invention claimed is:

1. A solar power generation network shut-off unit that is disposed between a plurality of solar power generation modules and a power conditioner and that shuts off a supply of power from the solar power generation modules to the power conditioner when an emergency shut-off button is pressed, the solar power generation network shut-off unit comprising:
   a first circuit breaker that is provided to a power line connecting the plurality of solar power generation modules and the power conditioner in series, and, when the emergency shut-off button is pressed, the first circuit breaker configured to shut-off a supply of power through this power line from the solar power generation modules, and transmit an emergency shut-off signal; and
   second circuit breakers that are provided to each of a plurality of solar power generation modules and, when the emergency shut-off signal is received from the first circuit breaker, the second circuit breakers configured to shut-off a supply of power from the plurality of solar power generation modules through the power line, and transmit a shut-off completion signal to the first circuit breaker.

2. The solar power generation network shut-off unit according to claim 1,
   wherein the first circuit breaker has a first emergency shut-off determination unit configured to detect that the emergency shut-off button has been pressed; a first shut-off unit configured to shut-off the supply of power from the solar power generation modules through the power line; a first shut-off control unit configured to control the first shut-off unit so as to shut-off the supply of power when the first emergency shut-off determination unit determines that the emergency shut-off button has been pressed; a first signal receiving unit configured to receive the shut-off completion signals from the second circuit breakers; and a first shut-off completion determination unit configured to determine whether or not a shut-off of the second circuit breakers has been completed depending on whether or not the first signal receiving unit has received the shut-off completion signals.

3. The solar power generation network shut-off unit according to claim 2,
   wherein the first circuit breaker further has a display signal output unit configured to transmit to the power conditioner a display signal that controls a display unit provided to the power conditioner so as to give a display indicating that an emergency shut-off is in progress upon receiving the shut-off completion signals from all of the second circuit breakers.

4. The solar power generation network shut-off unit according to claim 3,
   wherein the display signal output unit transmits to the power conditioner a display signal that controls a display unit provided to the power conditioner so as to give a display indicating that a shut-off error is occurring up until the shut-off completion signals are received from all of the second circuit breakers.

5. The solar power generation network shut-off unit according to claim 4,
   wherein, in addition to a display signal indicating that a shut-off error is occurring, the display signal output unit transmits to the power conditioner an address of the second circuit breaker in which the shut-off error is occurring.

6. The solar power generation network shut-off unit according to claim 1,
wherein each second circuit breaker has a second communication unit configured to receive the emergency shut-off signal and transmits the shut-off completion signal; a second emergency shut-off determination unit configured to determine whether or not the second communication unit has received the emergency shut-off signal; a second shut-off unit configured to shut-off the supply of power from the solar power generation modules through the power line; a second shut-off control unit configured to control the second shut-off unit so as to shut-off the supply of power when the second communication unit receives the emergency shut-off signal; and a second shut-off completion determination unit configured to determine a completion of the shut-off of the second shut-off unit.

7. The solar power generation network shut-off unit according to claim 1,
wherein the second circuit breaker controls the second shut-off unit so that the second shut-off control unit shuts off the supply of power after confirming a shut-off state at the first circuit breaker.

8. The solar power generation network shut-off unit according to claim 6,
wherein the second circuit breakers each further have a power supply holding unit configured to store an electric power supplied from the solar power generation modules.

9. The solar power generation network shut-off unit according to claim 1,
wherein the first circuit breaker and the second circuit breakers transmit and receive the emergency shut-off signal through wired communication.

10. The solar power generation network shut-off unit according to claim 2,
wherein the first circuit breaker further has a first communication unit configured to transmit a communication signal to the second circuit breakers; and a first communication control unit configured to control the first communication unit so as to continuously transmit the communication signal.

11. The solar power generation network shut-off unit according to claim 10,
wherein the second circuit breakers have a signal determination unit configured to detect that a reception of the communication signal received by the second communication unit has been interrupted; and a disconnection determination unit configured to determine that there is a disconnection in the power line after a specific length of time has elapsed since the disconnection determination unit has detected an interruption in the reception of the communication signal.

12. A solar power generation network shut-off unit that is disposed between a plurality of solar power generation modules and a power conditioner and that shuts off a supply of power from the solar power generation modules to the power conditioner, the solar power generation network shut-off unit comprising:
a first circuit breaker that is provided to a power line connecting the plurality of solar power generation modules and the power conditioner in series, the first circuit breaker configured to shut-off a supply of power from the solar power generation modules through the power line, and continuously transmit a communication signal; and second circuit breakers that are provided to each of a plurality of solar power generation modules, the second circuit breaker configured to receive the communication signal continuously transmitted from the first circuit breaker, and, when a specific length of time has elapsed since an interruption of a reception of the communication signal, shut-off a supply of power from the plurality of solar power generation modules through the power line, and transmit a shut-off completion signal to the first circuit breaker.

13. The solar power generation network shut-off unit according to claim 12,
wherein the first circuit breaker has a first communication unit configured to transmit the communication signal and receive the shut-off completion signal and a response signal to the communication signal transmitted to the second circuit breakers; a first communication control unit configured to control the first communication unit so as to continuously transmit the communication signal; and a response determination unit configured to determine whether or not the response signal has been received.

14. The solar power generation network shut-off unit according to claim 13,
wherein the first circuit breaker further has a display signal output unit configured to transmit to the power conditioner a display signal that controls a display unit provided to the power conditioner so as to give a display indicating that an emergency shut-off is in progress upon receiving the shut-off completion signals from all of the second circuit breakers.

15. The solar power generation network shut-off unit according to claim 14,
wherein the display signal output unit transmits to the power conditioner a display signal that controls a display unit provided to the power conditioner so as to give a display indicating that a shut-off error is occurring up until the shut-off completion signals are received from all of the second circuit breakers.

16. The solar power generation network shut-off unit according to claim 15,
wherein, in addition to a display signal indicating that a shut-off error is occurring, the display signal output unit transmits to the power conditioner an address of the second circuit breaker in which the shut-off error is occurring.

17. The solar power generation network shut-off unit according to claim 13,
wherein the second circuit breakers have a second communication unit configured to receive the communication signal continuously transmitted from the first communication unit and transmit the shut-off completion signal; a signal determination unit configured to detect that a reception of the communication signal received by the second communication unit has been interrupted; a disconnection determination unit configured to determine that there is a disconnection in the power line if a specific length of time has elapsed since the signal determination unit detected that the reception of the communication signal has been interrupted; a second shut-off unit configured to shut-off the supply of power from the solar power generation modules through the power line; a second shut-off control unit configured to control the second shut-off unit so as to shut-off the supply of power when the disconnection determination unit has determined that there is a disconnection; and a second shut-off completion determination unit configured to determine a completion of the shut-off of the second shut-off unit.

18. The solar power generation network shut-off unit according to claim 17,
wherein the second shut-off control unit controls the second shut-off unit so as to shut-off the supply of power after the disconnection determination unit has determined that there is a disconnection in the power line and a system including the solar power generation modules is opened.

19. The solar power generation network shut-off unit according to claim 17,
wherein the second circuit breakers further have a power supply holding unit configured to store an electric power supplied from the solar power generation modules.

20. The solar power generation network shut-off unit according to claim 12,
wherein the first circuit breaker and the second circuit breakers transmit and receive communication signals through wired communication.

21. A photovoltaic network shut-off system, comprising:
the solar power generation network shut-off unit according to claim 1;
the plurality of solar power generation modules;
the power conditioner;
the power line; and
the emergency shut-off button.

* * * * *